(12) United States Patent
Hiraguchi et al.

(10) Patent No.: US 7,059,554 B2
(45) Date of Patent: Jun. 13, 2006

(54) RECORDING TAPE CARTRIDGE

(75) Inventors: Kazuo Hiraguchi, Kanagawa (JP); Wataru Iino, Kanagawa (JP); Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/878,332

(22) Filed: Jun. 29, 2004

(65) Prior Publication Data

US 2004/0262437 A1 Dec. 30, 2004

(30) Foreign Application Priority Data

Jun. 30, 2003 (JP) .............................. 2003-187744

(51) Int. Cl.
*G11B 23/07* (2006.01)

(52) U.S. Cl. ................... 242/338.1; 242/348; 360/132

(58) Field of Classification Search ................ 242/342, 242/348, 611, 611.1, 612, 338.1, 343, 343.1, 242/343.2; 360/132
See application file for complete search history.

(56) References Cited

U.S. PATENT DOCUMENTS

| | | | | |
|---|---|---|---|---|
| 5,027,249 A | * | 6/1991 | Johnson et al. ............. | 360/132 |
| 5,893,527 A | * | 4/1999 | Mizutani et al. ............ | 242/348 |
| 5,901,916 A | | 5/1999 | McAllister et al. | |
| 6,113,020 A | * | 9/2000 | Nayak ........................ | 242/348 |
| 6,164,579 A | * | 12/2000 | Todd ........................... | 242/342 |
| 6,273,352 B1 | * | 8/2001 | Johnson et al. ............. | 360/132 |
| 6,452,747 B1 | * | 9/2002 | Johnson et al. ............. | 360/132 |
| 6,563,671 B1 | | 5/2003 | Morita et al. | |
| 6,581,866 B1 | * | 6/2003 | Tsuyuki et al. ............. | 242/348 |

FOREIGN PATENT DOCUMENTS

| | | |
|---|---|---|
| JP | 11-185437 A | 7/1999 |
| JP | 3187022 B2 | 5/2001 |

* cited by examiner

*Primary Examiner*—William A. Rivera
(74) *Attorney, Agent, or Firm*—Sughrue Mion, PLLC

(57) ABSTRACT

A recording tape cartridge in which a reel includes a reel gear and an engaging gear. The reel gear is formed in an annular shape at an outer face of a base portion of a reel hub. The engaging gear is formed in an annular shape at an inner face of the base portion. Magnetic tape is wound onto an outer periphery of the reel hub. A braking member is engaged with the engaging gear by an urging force and prevents the reel from rotating. A clutch member opposes a gear aperture at a radial direction inner side relative to the reel gear. An operationally pushed surface of the clutch member is pushed by a releasing surface of a drive device and the brake member is lifted, whereby rotation of the reel is enabled.

22 Claims, 12 Drawing Sheets

PRIOR ART FIG.13
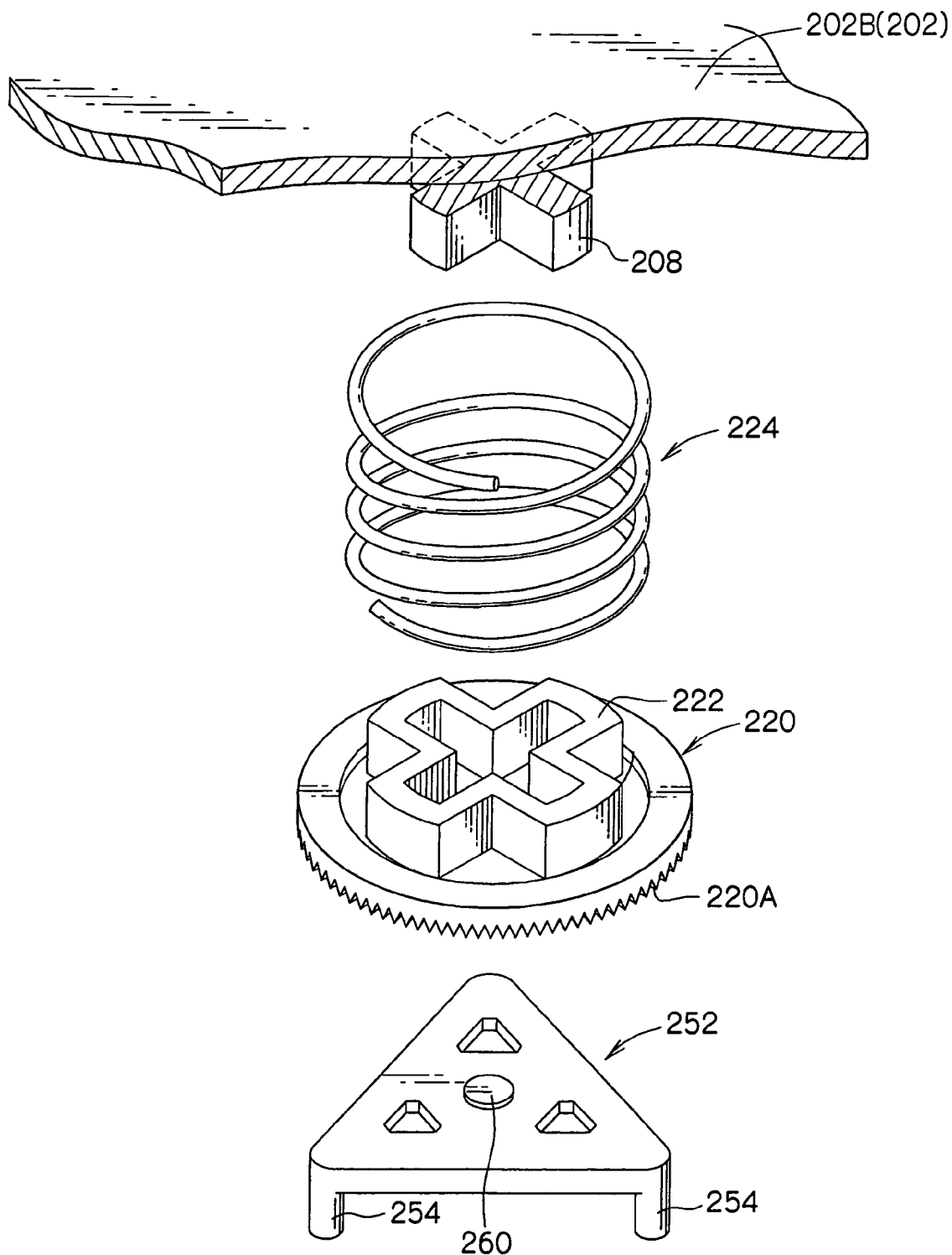

RECORDING TAPE CARTRIDGE

CROSS-REFERENCE TO RELATED APPLICATION

This application claims priority under 35 USC 119 from Japanese Patent Application No. 2003-187744, the disclosure of which is incorporated by reference herein.

BACKGROUND OF THE INVENTION

1. Field of the Invention

The present invention relates to a recording tape cartridge which rotatably accommodates a reel onto which recording tape, such as a magnetic tape or the like, is wound.

2. Description of the Related Art

Recording tapes such as magnetic tapes and the like are used as external recording media for computers and the like. "One-reel" recording tape cartridges, which rotatably accommodate a single reel onto which a recording tape is wound in a case, can reduce space requirements for accommodation during storage and can record large amounts of information, and are employed as such recording tapes.

Such a recording tape cartridge is equipped with a braking structure such that the reel does not rotate inside the case at times of non-use (see, for example, the specification of Japanese Patent Application Laid-Open (JP-A) No. 63-251983). A recording tape cartridge equipped with this braking structure is now described with reference to FIG. 11.

In a recording tape cartridge 200 shown in FIG. 11, a single reel 204 is accommodated in a case 202. The case 202 is provided with a gear aperture 206 and a rotation-limiting rib 208. The gear aperture 206 is formed at a central portion of a floor plate 202A of the case 202. The rotation-limiting rib 208 protrudes downward from a ceiling plate 202B of the case 202.

The reel 204 is provided with a reel hub 210, which is formed in the shape of a circular tube with a base, around an outer peripheral portion of which recording tape is wound. At a lower face (outer side) of a base portion 210A of the reel hub 210, a reel gear 214 is formed in an annular shape. The reel gear 214 is meshable with a driving gear 212A, which is formed at a rotation shaft 212 of a drive device.

At an upper face (inner side) of the base portion 210A, an engaging gear 216 is formed in an annular shape. A through-hole 218 is formed in an axial center portion of the base portion 210A. An annular reel plate 219 is fixed at a radial direction inner side of the reel gear 214 at the lower face of the base portion 210A. The reel plate 219 is formed of a magnetic material and includes, at an axial center portion thereof, a through-hole which substantially corresponds with the through-hole 218.

A disc-like brake member 220 is insertedly provided inside the reel hub 210. An annular brake gear 220A is provided at a lower face of the brake member 220. The brake gear 220A is meshable with the engaging gear 216. An engaging projection 222 is provided standing from an upper face of the brake member 220. The rotation-limiting rib 208 of the case 202 is inserted into the engaging projection 222, and renders the brake member 220 incapable of rotating relative to the case 202 but capable of moving in a vertical direction of the case 202. Meanwhile, an engaging projection 223 is provided protruding from an axial center portion of a lower face of the brake member 220. The engaging projection 223 enters into the through-hole 218 of the reel hub 210 and faces the gear aperture 206.

A compression coil spring 224 is disposed between the ceiling plate 202B of the case 202 and the brake member 220. The brake member 220 is continuously urged downward by urging force of the compression coil spring 224, and the brake gear 220A is meshed with the engaging gear 216.

Accordingly, at times when the recording tape cartridge 200 is not in use, the recording tape cartridge 200 is set to a rotation-locked state in which rotation of the reel 204 relative to the case 202 is blocked. Further, the reel 204 is pressed against the floor plate 202A of the case 202 by the urging force, and the reel gear 214 is exposed through the gear aperture 206.

On the other hand, when the recording tape cartridge 200 is being loaded at a drive device, in accordance with an operation in which the driving gear 212A meshes with the reel gear 214, a releasing portion 212B, which is provided protruding from an axial center portion of the rotation shaft 212, abuts against the engaging projection 223 of the brake member 220 and pushes the same.

As a result, the brake member 220 is pushed upward, against the urging force of the compression coil spring 224, and the meshing of the brake gear 220A with the engaging gear 216 is released. In a state in which the driving gear 212A and the reel gear 214 are fully meshed, the reel plate 219 of the reel 204 is attracted to an annular magnet 212C, which is provided between the driving gear 212A and the releasing portion 212B of the rotation shaft 212. Thus, the reel 204 is rendered capable of rotation within the case 202, and this meshing is maintained.

Hence, when the rotation shaft 212 rotates about the axis thereof, the reel 204 rotates integrally therewith. At such a time, because the brake member 220 is non-rotatable relative to the case 202, the engaging projection 223 and releasing portion 212B slidingly contact one another. In order to reduce rubbing resistance thereat, the engaging projection 223 of the brake member 220 is formed of a resin material, and the releasing portion 212B of the drive device is correspondingly formed with a resin material.

However, the recording tape cartridge 200 with the structure described above has the following problems. Firstly, because the engaging projection 223 and the releasing portion 212B rub against one another in accordance with rotation of the reel 204, if speeds of rotation of the reel 204 are increased and/or continuous rotation times are lengthened, one or both of the engaging projection 223 and the releasing portion 212B will become worn. In such a case, if it is the engaging projection 223 that becomes worn, it is possible to arrange for replacement of that component. However, if the releasing portion 212B of the drive device becomes worn, maintenance is troublesome and maintenance costs are high.

Secondly, because the relatively large engaging projection 223 is provided protruding from the lower face of the brake member 220, a center of gravity of the brake member 220 as a whole is high (a condition similar to a spinning top), and large vibrations may be caused by slight offsets during rotation of the reel 204. Such vibrations are a cause for the generation of abrasion dust due to continuous sliding of the rotation-limiting rib 208 against the engaging projection 222, increases in wear of the engaging projection 223 and/or the releasing portion 212B, and the like. In order to prevent this, a distal end of the engaging projection 223 has a flat surface 223A, which makes surface contact with the releasing portion 212B. However, the area of the flat surface 223A is very small, so as to reduce the aforementioned sliding resistance, and is not large enough to prevent these vibrations. Furthermore, if a protrusion length of the engaging projection 223 is reduced, it is necessary to make the releasing portion 212B of the drive device longer, and a relative stroke in the axial direction when the driving gear 212A is meshing with the reel gear 214 is greater, which leads to an increase in size of the drive device.

Thirdly, the rotation shaft 212 is structured with a metallic material, due to requirements of strength, endurance and the like, while, as mentioned above, the releasing portion 212B mounted at the rotation shaft 212 to correspond with the brake member 220 is structured with a resin material. However, because the magnet 212C is disposed around the releasing portion 212B, it is not possible to affix the releasing portion 212B from the upper side (the recording tape cartridge 200 side). Consequently, the releasing portion 212B is fixed to the rotation shaft 212 by fixing with screws from a side of driving by a motor or the like, as shown in the illustration. Thus, arrangements of a motor and the like in the drive device are limited. In other words, degrees of freedom of design of the recording tape cartridge 200 and of drive devices in which the recording tape cartridge 200 is to be loaded have been limited.

Accordingly, structures in which a release member is interposed between the brake member 220 and the rotation shaft 212 are known (see, for example, JP-A No. 11-185437 and Japanese Patent No. 3,187,022).

A structure of JP-A No. 11-185437 is equipped with a release member with a view to dust-protection. This release member is formed of a resin and is relatively rotatable with respect to both a brake member and a reel. Thus, this release member is not a solution to the problems described above.

On the other hand, a structure in the specification of Japanese Patent No. 3,187,022 is equipped with a release member as a countermeasure to the problems described above. Accordingly, parts of this structure that differ from the recording tape cartridge 200 will be described with reference to FIGS. 12 and 13.

A recording tape cartridge 250, which is shown in FIG. 12, is provided with a release member 252 formed of resin, which is disposed between the base portion 210A of the reel hub 210 and the brake member 220. As shown in FIG. 13, the release member 252 is formed in a substantially equilateral triangle shape in plan view, and is provided with leg portions 254 which are provided protruding downward from the corner portions thereof. The leg portions 254 respectively enter into insertion through-holes 256, which are formed in the base portion 210A instead of the through-hole 218, and face the gear aperture 206.

The insertion through-holes 256 penetrate through the base portion 210A at a region at which the reel gear 214 is formed. A diameter of each insertion through-hole 256 is set to be larger than a gear pitch of the reel gear 214, and teeth of the reel gear 214 are not provided in a vicinity around each insertion through-hole 256. Meanwhile, a plurality of engaging protrusions 258 is provided at the upper face of the base portion 210A, instead of the engaging gear 216. The engaging protrusions 258 are disposed at equal intervals along a predetermined circular circumference, so as not to coincide with the corner portions of the release member 252. Gear teeth 258A, which are meshable with the brake gear 220A, are formed at upper ends of the engaging protrusions 258.

A sliding protrusion portion 260 is provided protruding from an axial center portion of an upper face of the release member 252. The sliding protrusion portion 260 continuously abuts against a sliding protrusion portion 262, which is provided instead of the engaging projection 223 at the brake member 220.

With this recording tape cartridge 250, at times of non-use, the brake gear 220A of the brake member 220 is meshed with the gear teeth 258A of the reel 204 by the urging force of the compression coil spring 224. Hence, rotation of the reel 204 relative to the case 202 is blocked. In this state, the release member 252 abuts against the brake member 220 at the sliding protrusion portion 260, and the lower face of the release member 252 is pressed against the base portion 210A. Furthermore, end faces of the leg portions 254, which are disposed in the respective insertion through-holes 256, are substantially flushd with tooth peaks of the reel gear 214.

On the other hand, when the recording tape cartridge 250 is being loaded in a drive device, the reel gear 214 meshes with the driving gear 212A of the rotation shaft 212, at which the releasing portion 212B is not provided. In accordance with this meshing, the leg portions 254 are pushed by the driving gear 212A, and the release member 252 is pushed upward against the urging force of the compression coil spring 224.

Accordingly, the release member 252 is separated from the base portion 210A while the brake member 220 is being pushed upward, and the meshing of the brake gear 220A with the gear teeth 258A is released. While the meshing of the driving gear 212A with the reel gear 214 is maintained, the leg portions 254 of the release member 252 are in contact with the driving gear 212A. Thus, this structure retains the brake member 220 at the released position.

Hence, when the rotation shaft 212 rotates, the reel 204 rotates inside the case 202. At such a time, the release member 252, whose leg portions 254 are inserted in the insertion through-holes 256 of the reel 204, rotates integrally with the reel 204, and the sliding protrusion portion 260 of the release member 252 rubs against the sliding protrusion portion 262 of the brake member 220.

As descried above, in the recording tape cartridge 250, the release member 252, which abuts, at the respective leg portions 254, against the tooth peaks of the driving gear 212A of the rotation shaft 212, rotates integrally with the reel 204. Therefore, there are no locations at which the drive device rubs against the recording tape cartridge 250 in accordance with the rotation of the reel 204, and there is no risk of drive device side members becoming worn. Furthermore, because the release member 252 is interposed between the brake member 220 and the rotation shaft 212, the position of the center of gravity of the brake member 220 is lower, and vibrations of the brake member 220 during rotation of the reel 204 are suppressed.

In particular, because the release member 252 is pushed by the rotation shaft 212 at the leg portions 254 which are disposed to be distant from the axial center of the reel 204, an attitude of the release member 252 during rotation of the reel 204 is stable, and is unlikely to cause vibrations of the brake member 220.

Further, because the rotation shaft 212 pushes the release member 252 with the driving gear 212A, there is no need to provide the releasing portion 212B which is fabricated of resin, and the structure of the recording tape cartridge 250 does not apply limitations to layouts of motors and the like in drive devices. Note that the magnet 212C is not shown in FIG. 12.

However, even the conventional recording tape cartridge 250 as described above has problems, as follows.

Firstly, the leg portions 254 of the release member 252, which is fabricated of resin, are pushed by the tooth peaks of the driving gear 212A, which is fabricated of metal, for moving the brake member 220 to a rotation-enabling position and holding the brake member 220 at that position.

Therefore, even though there is no sliding contact between the release member 252 and the driving gear 212A in accordance with the rotation, the leg portions 254 will be subject to wearing by usage over long periods (i.e., being repeatedly pushed).

Secondly, because the release member 252 is moved upward by the driving gear 212A which meshes with the reel gear 214, a movement stroke of the release member 252 is limited by a height of the teeth of the reel gear 214 (and the driving gear 212A), and it is difficult to ensure a generous release stroke. In particular, if the leg portions 254 are worn as mentioned above, the release member stroke is reduced and there is a risk that lock-releasing of the reel 204 may not be effected. If, in order to counter this, the leg portions 254 are made to protrude beyond the tooth peaks of the reel gear 214, there is a risk that locking of the reel 204 will be released at times of non-use.

Thirdly, the reel gear 214 is formed in a large-diameter annular form as a whole, in order to reduce driving force from the rotation shaft 212. Thus, at the base portion 210A, the reel gear 214 is disposed to be separated as far as possible from the axial center. Meanwhile, in order to guarantee braking force from the brake member 220, the engaging protrusions 258 featuring the gear teeth 258A are disposed on a circular circumference with as large a diameter as possible. Thus, the reel gear 214 and the engaging protrusions 258 are arranged in the vertical direction at substantially the same position, or the reel gear 214 that is formed at the outer face side is disposed slightly to a radial direction outer side relative to the engaging protrusions 258.

Consequently, because the engaging protrusions 258 should not interfere with the corner portions of the release member 252 (portions thereof which correspond to the region at which the reel gear 214 is formed), the engaging protrusions 258 cannot be provided with a continuous annular form. In consequence, the engaging protrusions 258 have to be provided partially and, in comparison to the engaging gear 216 that is provided in an annular form, a centering function (centripetal force) of the brake member 220 due to the meshing thereat is weak.

When the centering function of the recording tape cartridge 250 is poor, it is likely, particularly during assembly of the brake member 220, that the brake member 220 will ride up on the gear teeth 258A, and careful operation (in the case of an automatic assembly device, a high level of monitoring) is necessary. Furthermore, the reel gear 214 is similarly non-continuous in the circumferential direction, because of the insertion through-holes 256. As a result, the centering function is weakened, and torque that can be transmitted from the rotation shaft 212 is reduced.

Fourthly, because the release member 252 is disposed in the reel hub 210, a rotation-locking position of the brake member 220, which is disposed to be separated from the reel hub 210, is raised by an amount corresponding to thickness of the release member 252, and braking of the reel 204 by the brake member 220 may be inconsistent.

Furthermore, because the rotation-locking position is higher, a protrusion height of the engaging protrusions 258 from the reel hub 210 is higher than with the engaging gear 216, and the engaging protrusions 258 form thick portions at the reel hub 210. As a result, flow characteristics of resin during formation of the reel hub 210 that is formed of a usual resin are poor, which leads to a deterioration in formation characteristics.

As described above, there is still room for improvement of a release member for releasing a state in which a reel is locked by a brake member.

SUMMARY OF THE INVENTION

In consideration of the circumstances described above, an object of the present invention is to provide a recording tape cartridge which is capable of reliably locking a reel with a brake member and releasing the locking with a release member, and which is capable of reducing limitations that are applied to an engaging portion and a reel gear by provision of the release member.

In order to achieve the object described above, in a first aspect of the present invention, a recording tape cartridge is provided which includes: a reel including a reel hub formed in a tubular shape with a base, recording tape being wound on an outer peripheral portion of the reel hub; an annular reel gear provided coaxially at an outer face of a base portion of the reel hub and capable of meshing with a driving gear of a drive device; an engaging portion provided at an inner face of the base portion along a circular circumference which is coaxial with the base portion; a case including a gear aperture, rotatably accommodating the reel, and exposing the reel gear through the gear aperture; a brake member provided to be non-rotatable relative to the case and movable toward and away from the base portion, the brake member being capable of attaining a rotation-locking position for engaging with the engaging portion and a rotation-enabling position for releasing a state of engagement with the engaging portion; an urging structure provided between the case and the brake member, the urging structure retaining the brake member at the rotation-locking position by an urging force; and a release member including a main body portion disposed in the reel hub at a radial direction inner side relative to the engaging portion, and an operation portion provided at the main body portion and facing the gear aperture through a portion of the base portion at a radial direction inner side relative to the reel gear, the release member being provided to be non-rotatable relative to the reel and movable in an axial direction, and the operation portion being pushed by a releasing portion of the drive device for moving the brake member to the rotation-enabling position against the urging force.

In a tape cartridge of the present aspect, the brake member is ordinarily (i.e., when the recording tape cartridge is not in use) rendered incapable of rotation relative to the case by the urging force of the urging structure. Specifically, the brake member is disposed at the rotation-locking position to engage with the engaging member which is provided along the predetermined circular circumference at the inner face of the base portion of the reel hub, and is in a rotation-locked state in which rotation of the reel relative to the case is blocked.

Further, the reel gear of the reel is exposed to the outside through the gear aperture of the case, and the operation portion of the release member opposes the gear aperture so as to be pushable by the releasing portion of a drive device (i.e., is exposed to the outside).

The releasing member may, for example, be disposed wholly within the reel hub with the operation portion opposing the gear aperture through a through-hole formed in the reel hub, and a portion including the operation portion may be inserted at the through-hole and passed through the through-hole.

In contrast, when the reel is to be rotated (at a time of use of the recording tape cartridge), the releasing portion of the drive device pushes the operation portion of the release member. The release member is moved by the pushing force to the brake member side thereof, against the urging force, and the main body portion abuts against the brake member while moving the brake member from the rotation-locking position to the rotation-enabling position (i.e., moving the brake member away from the base portion). Hence, when the driving gear that is meshed with the reel gear rotates in the state in which the releasing portion abuts against the operation portion, that is, the state in which the brake member is retained at the rotation-enabling position, the reel rotates relative to the case. At this time, the release member, which is not rotatable relative to the reel, rotates integrally with the reel, and there is no sliding contact between the operation portion and the releasing portion.

Here, it is favorable that the pushing of the operation portion by the releasing portion is carried out in accordance with an operation of meshing the driving gear of the drive device with the reel gear.

Now, because the main body portion of the release member is disposed at the radial direction inner side relative to the engaging portion (relative to the predetermined circular circumference), it is possible for the engaging portion to be formed in a continuous annular form and, for example, an improvement in braking characteristics of the reel by the brake member is expected.

Further, because the operation portion of the release member faces the gear aperture from the radial direction inner side relative to the reel gear, there is no need to provide non-continuous portions at the reel gear for operating the release member. Thus, formation of the reel gear in a continuous annular form is enabled and, for example, an increase in torque that is transmitted from the driving gear and assurance of strength with respect to torque is expected.

Because the releasing portion of the drive device is not the driving gear that meshes with the reel gear, a movement stroke of the release member is not limited by tooth heights of the reel gear (and the driving gear), and it is possible to guarantee a release stroke that is sufficient for releasing the locking of the reel by the brake member.

Further, limitations on the form of the releasing portion of the drive device are removed, and the releasing portion can be given a form which does not cause wear by the pushing. In particular, because there is no sliding contact between the operation portion of the release member and the releasing portion of the drive device, there is no limitation on arrangements in the drive device in accordance with particular countermeasures therefor, such as structuring the releasing portion with a resin material, as in the prior art, or the like.

Thus, with the recording tape cartridge of the first aspect, it is possible to reliably carry out locking of the reel with the brake member and release of the locking with the release member, and it is possible to restrain limitations on the engaging portion and the reel gear due to the provision of the release member.

In a second aspect of the present invention, a through-hole passes through the base portion, and at least a portion of the main body portion of the release member is disposed in the through-hole.

In a recording tape cartridge of the present aspect, at least a portion of the main body portion (of the release member), which is disposed in a tubular portion of the reel hub at the radial direction inner side of the engaging member, is disposed in the through-hole which passes through the base portion of the reel hub. In other words, the at least a portion of the main body portion is disposed at a region of plate thickness of the base portion. Consequently, a protrusion height of the release member to the base portion inner face side is restrained. As a result, it is possible to provide a release member while keeping a position of engagement of the brake member with the engaging portion low.

In a third aspect of the present invention, the operation portion of the release member is formed to make surface contact with the releasing portion of the drive device.

According to the recording tape cartridge of the present aspect, at the time of releasing rotation-locking of the reel, the operation portion of the release member and the releasing portion of the drive device, which pushes the operation portion, are in surface contact. Consequently, wearing therebetween is reliably prevented.

In a fourth aspect of the present invention, the operation portion is caused to face the gear aperture at an axial center portion of the reel hub.

In a recording tape cartridge of the present aspect, the operation portion of the release member passes through, for example, a through-hole which penetrates through the axial center portion of the base portion of the reel hub (this includes a state which is only partially inserted) to face the gear aperture, or passes through (is inserted into) the through-hole and protrudes from an outer face of the base portion to face the gear aperture at the axial center portion of the reel hub.

Consequently, in a structure in which a magnetic plate provided at the outer face of the base portion of the reel hub is attracted by a magnet of the drive device, the operation portion provided at the axial center portion is less affected by attractive force from the magnet. That is, it is possible to structure the releasing portion separately from the magnet while maintaining the function of attraction by the magnet.

BRIEF DESCRIPTION OF THE DRAWINGS

FIG. 13 is an exploded perspective view showing a brake structure which structures the second conventional recording tape cartridge.

DETAILED DESCRIPTION OF THE INVENTION

A recording tape cartridge 10 relating to an embodiment of the present invention will be described with reference to FIGS. 1 to 10.

Figure 1A:
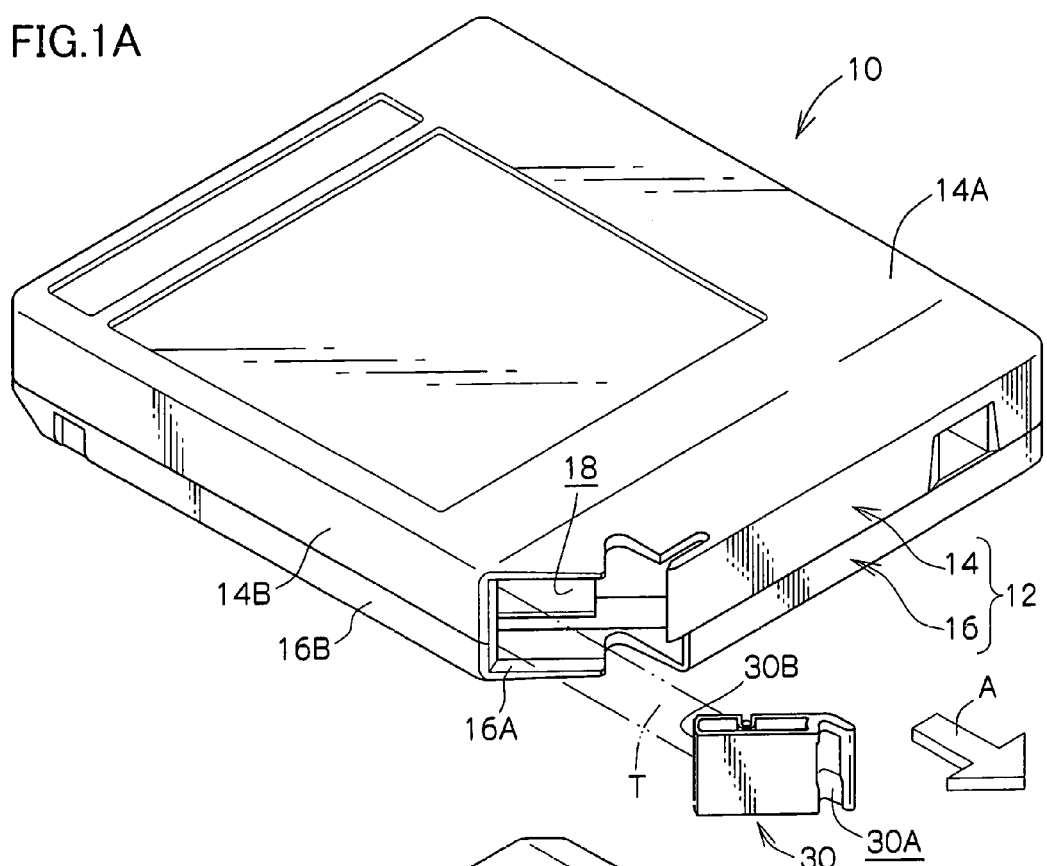
FIG. 1A is a perspective view, seen from above, of external appearance of a recording tape cartridge relating to an embodiment of the present invention.
Figure 1B:
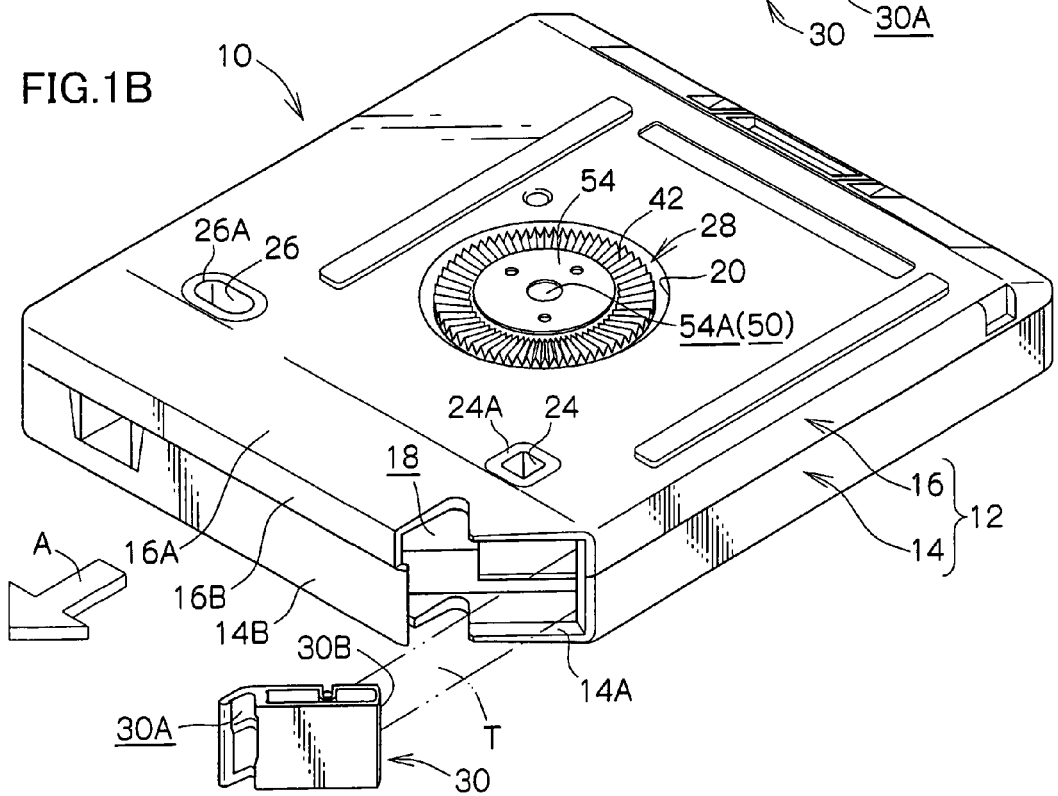
FIG. 1B is a perspective view, seen from below, of the external appearance of the recording tape cartridge relating to the embodiment of the present invention.
Figure 2:
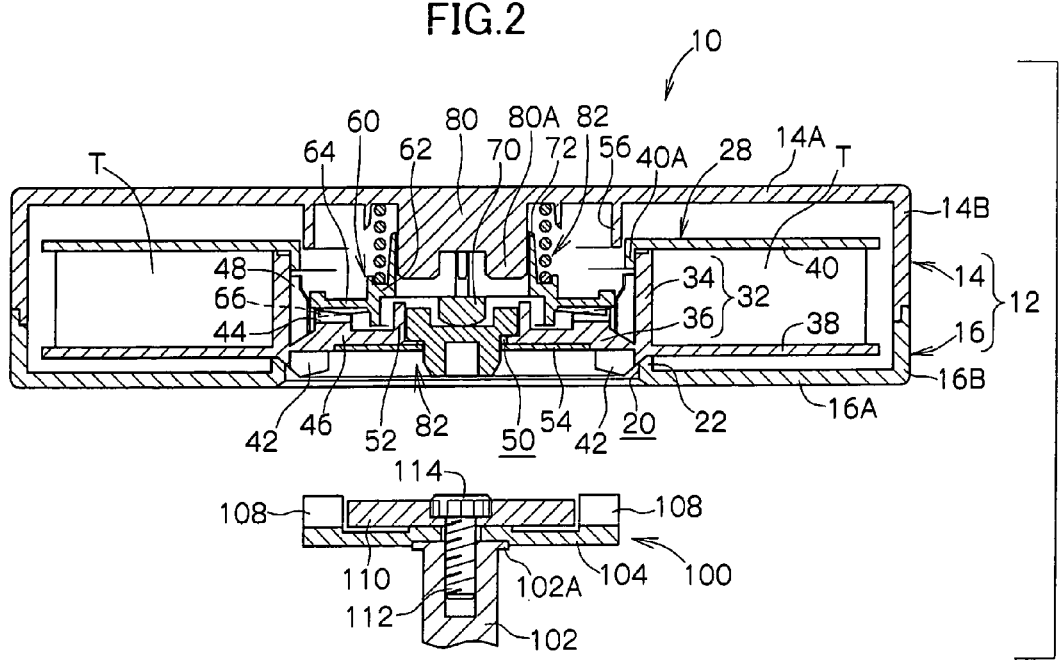
FIG. 2 is a sectional view of a reel in the recording tape cartridge relating to the embodiment of the present invention, when rotation is locked.

FIG. 1A shows a perspective view, seen from diagonally above, of the recording tape cartridge 10 and FIG. 1B shows a perspective view, seen from diagonally below, of the recording tape cartridge 10. FIG. 2 shows a sectional view of the recording tape cartridge 10. Note that an arrow A shown in FIGS. 1A and 1B represents a direction of loading of the recording tape cartridge 10 into a drive device. For convenience of explanation, the side indicated by arrow A is referred to as the front side.

As shown in these drawings, the recording tape cartridge 10 is provided with a case 12. The case 12 is structured by joining together an upper case 14 and a lower case 16. More specifically, the upper case 14 is structured with a substantially frame-like peripheral wall 14B provided standing along outer edges of a ceiling plate 14A which is substantially rectangular in plan view, and the lower case 16 is structured with a peripheral wall 16B provided standing along outer edges of a floor plate 16A which substantially corresponds with the ceiling plate 14A. Thus, the case 12 is formed in a substantial box form by, in a state in which the opening end of the peripheral wall 14B and the opening end of the peripheral wall 16B are matched up, joining the upper case 14 with the lower case 16 by ultrasonic welding, fixing with screws or the like.

At this case 12, at a corner portion at a leading side in the direction of loading the case 12 into a drive device, the ceiling plate 14A, the peripheral wall 14B, the floor plate 16A and the peripheral wall 16B are respectively cut away to form an aperture 18, which is angled outward with respect to the loading direction.

A circular gear aperture 20 which passes through the floor plate 16A is formed at a substantially central portion of the floor plate 16A, for exposure of a later-described reel gear 42. At a portion of the floor plate 16A at the edge of the gear aperture 20, an annular rib 22 is provided protruding toward the inside of the case 12, for positioning of a later-described reel 28.

A pair of positioning holes 24 and 26 is formed at a front end vicinity of an outer face of the floor plate 16A of the case 12. The two positioning holes 24 and 26 are provided in the form of pockets in protrusion portions (not shown), which are provided standing from the lower case 16 to the inside of the case 12. The positioning holes 24 and 26 are disposed to be spaced from one another along an imaginary line which intersects the loading direction. The positioning hole 24, which is at the side closer to the aperture 18, contacts the outside of a positioning pin of a drive device, and is formed in a substantially square shape in bottom plan view; the positioning hole 26 is formed as a long hole with length along the aforementioned imaginary line and a width corresponding to the diameter of another positioning pin.

Accordingly, when the recording tape cartridge 10 is loaded in a drive device and the respective positioning pins are inserted into the positioning holes 24 and 26, the recording tape cartridge 10 will be accurately positioned in horizontal directions (left-right and front-rear) in the drive device.

Portions surrounding the positioning holes 24 and 26 in the lower case 16 are formed as positioning surfaces 24A and 26A, which are finished more smoothly than other portions (which are design surfaces). When the positioning pins are inserted into the positioning holes 24 and 26, the positioning surfaces 24A and 26A abut against positioning surfaces of the drive device, which are provided around the positioning pins. Thus, this structure is effective for positioning the recording tape cartridge 10 in a vertical direction in the drive device.

As shown in FIG. 2, the reel 28, which is described in detail later, is rotatably accommodated inside the case 12 described above. Only one of the reel 28 is provided. A magnetic tape T, which serves as a recording tape, is wound on at the reel 28. A leader block 30, which serves as a drawing-out member, is attached to a distal end of the magnetic tape T.

When the recording tape cartridge 10 is not in use, the leader block 30 is accommodated and retained at an inner side of the aperture 18 of the case 12. In this state, the leader block 30 closes off the aperture 18, and ingression of dust or the like into the case 12 is blocked. An engaging recess portion 30A is formed at a distal end of the leader block 30. When the magnetic tape T is to be drawn out in the drive device, the leader block 30 is taken out from the case 12 by drawing-out means which engages with the engaging recess portion 30A, and is guided to a winding reel of the drive device. A circular arc wall 30B is formed at a side of the leader block 30 which is opposite to the side thereof at which the engaging recess portion 30A is formed. The leader block 30 is fitted into the winding reel, and the circular arc wall 30B structures a portion of a winding surface around which the magnetic tape T is to be wound.

Below, the reel 28, which is a principal component of the present invention, and a braking structure which blocks rotation of the reel 28 at times of non-use will be described in detail.

Figure 3:
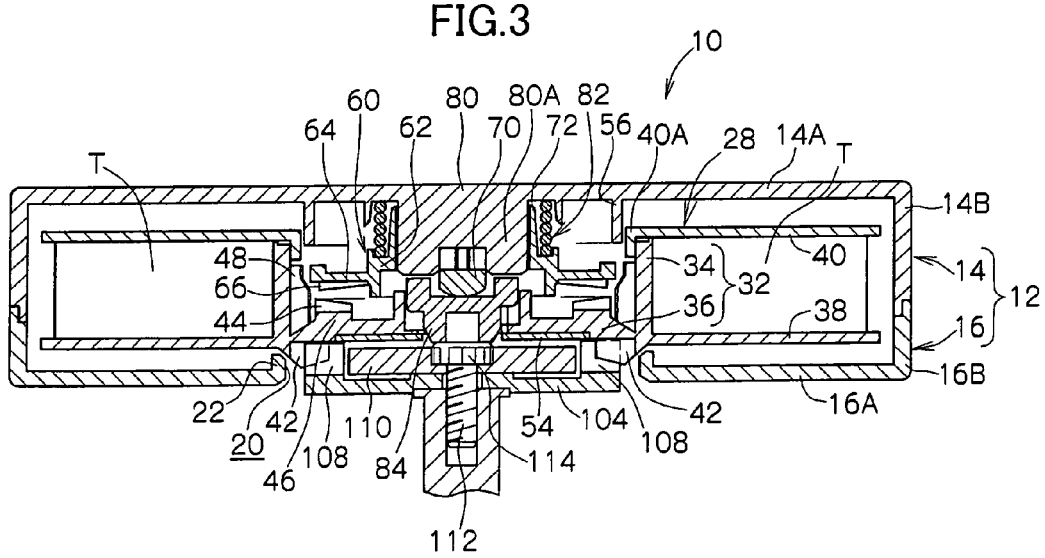
FIG. 3 is a sectional view of the reel in the recording tape cartridge relating to the embodiment of the present invention, when rotation-locking is released.
Figure 4:
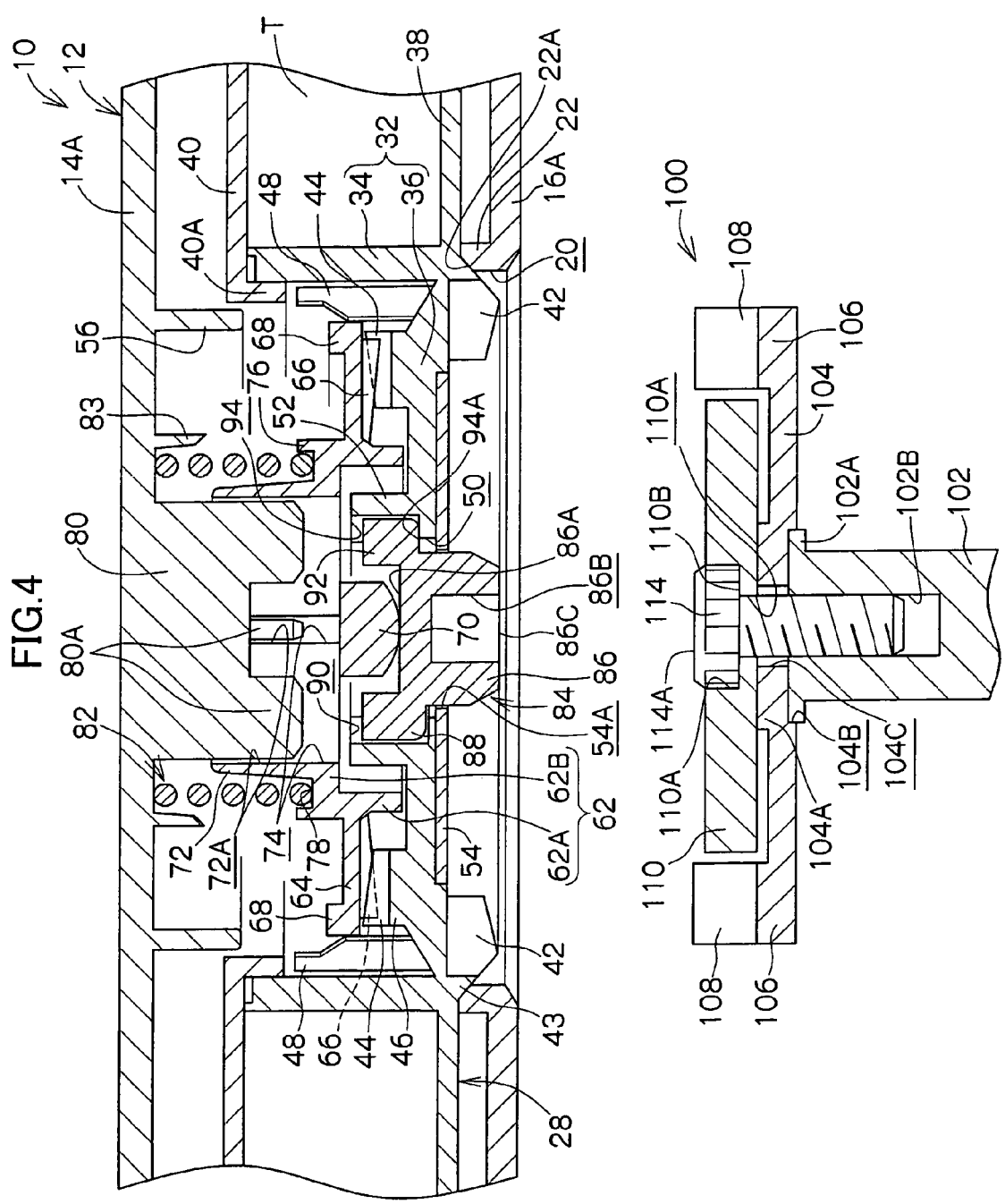
FIG. 4 is an enlarged sectional view of principal components in the recording tape cartridge relating to the embodiment of the present invention, when rotation is locked.
Figure 5:
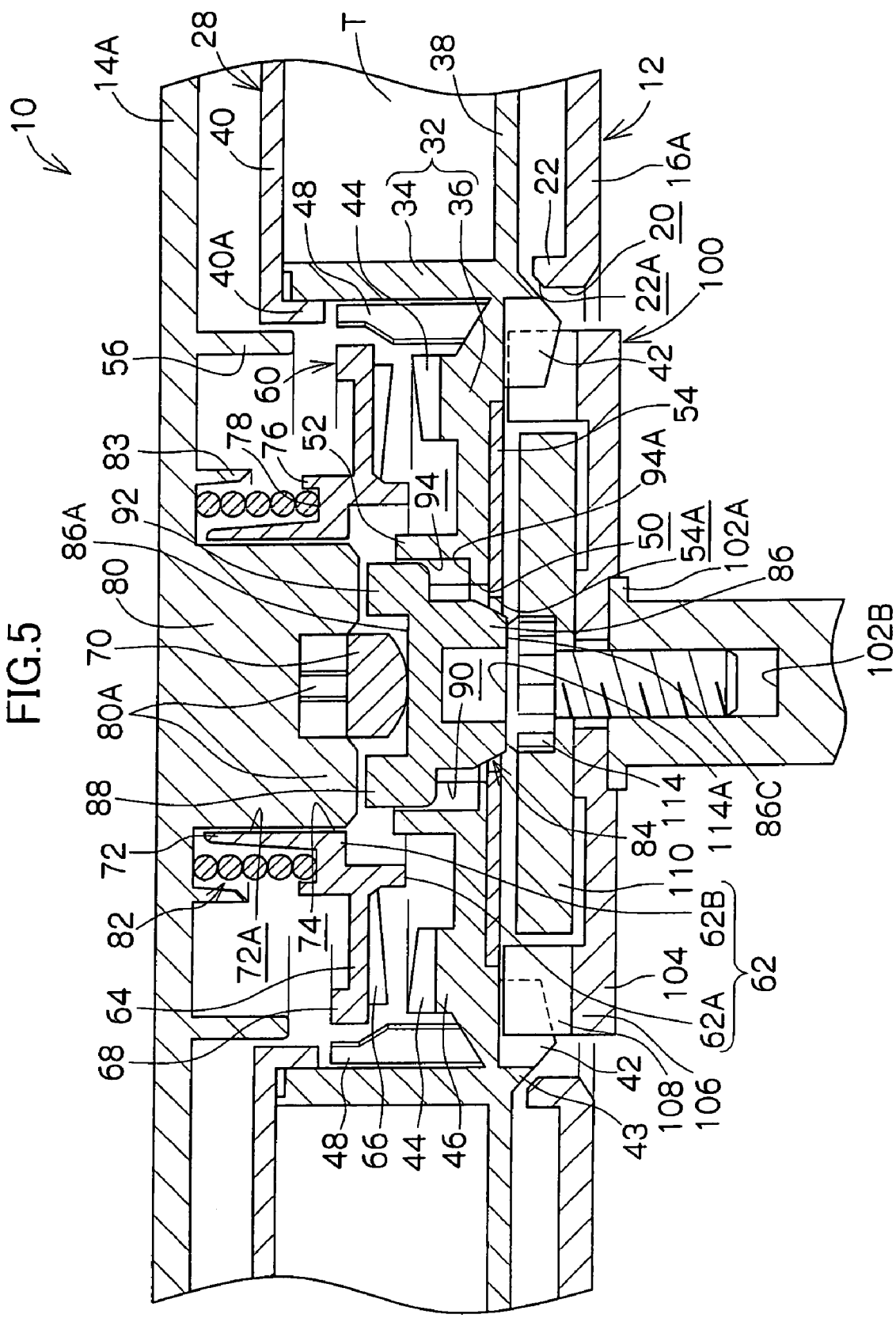
FIG. 5 is an enlarged sectional view of principal components in the recording tape cartridge relating to the embodiment of the present invention, when the rotation-locking is released.

As shown in FIGS. 3 to 5, the reel 28 is provided with a reel hub 32, which structures an axial center portion of the reel 28. The reel hub 32 is formed in a substantially circular tube shape having a base, including a tubular portion 34 and a base portion 36. The magnetic tape T is wound onto an outer peripheral surface of the tubular portion 34, and the base portion 36 closes off a lower portion of the tubular portion 34. As is also shown in FIG. 6, in a vicinity of a base portion 36 side end portion (lower end portion) of the reel hub 32, a lower flange 38 is coaxially and integrally provided at a radial direction outer side of the reel hub 32.

Figure 6:
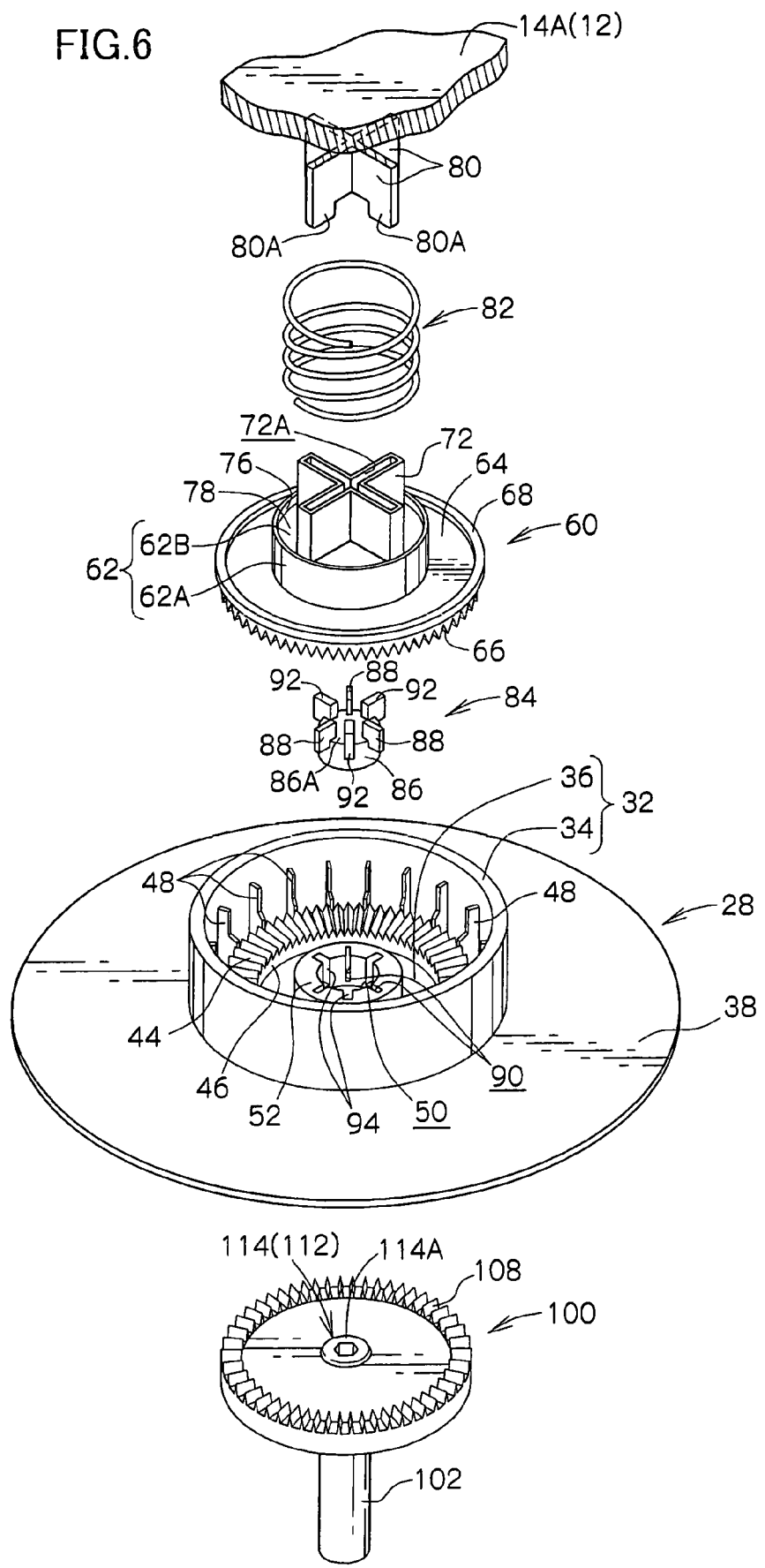
FIG. 6 is an exploded perspective view, seen from above, showing a rotation shaft of a drive device and a brake structure which structures the recording tape cartridge relating to the embodiment of the present invention.
Figure 8:
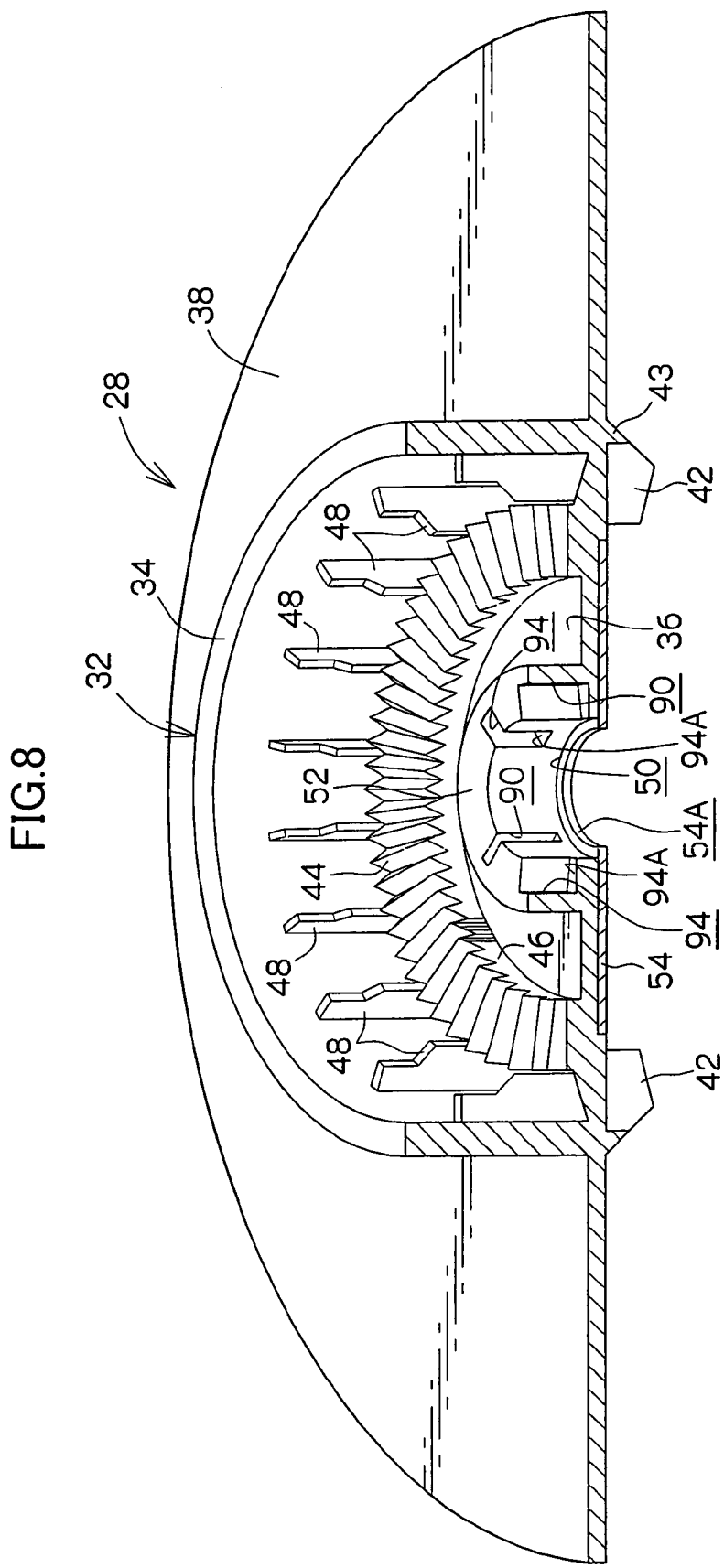
FIG. 8 is a sectional perspective view of the reel which structures the recording tape cartridge relating to the embodiment of the present invention.

An upper flange 40 is joined to an upper end portion of the reel hub 32 (but is not shown in FIGS. 6 and 8). An external diameter of the upper flange 40 is equal to an external diameter of the lower flange 38. A short tubular portion 40A, with an external diameter corresponding to an internal diameter of the tubular portion 34, is provided at an axial center portion of the upper flange 40. In a state in which the short tubular portion 40A is fitted in at an upper end vicinity of the tubular portion 34, the upper flange 40 is coaxially fixed to the reel hub 32 by ultrasonic welding.

Thus, at the reel 28, the magnetic tape T is wound round the outer peripheral surface of the tubular portion 34 of the reel hub 32, between opposing faces of the lower flange 38 and the upper flange 40, and the tubular portion 34 opens upward.

Figure 7:
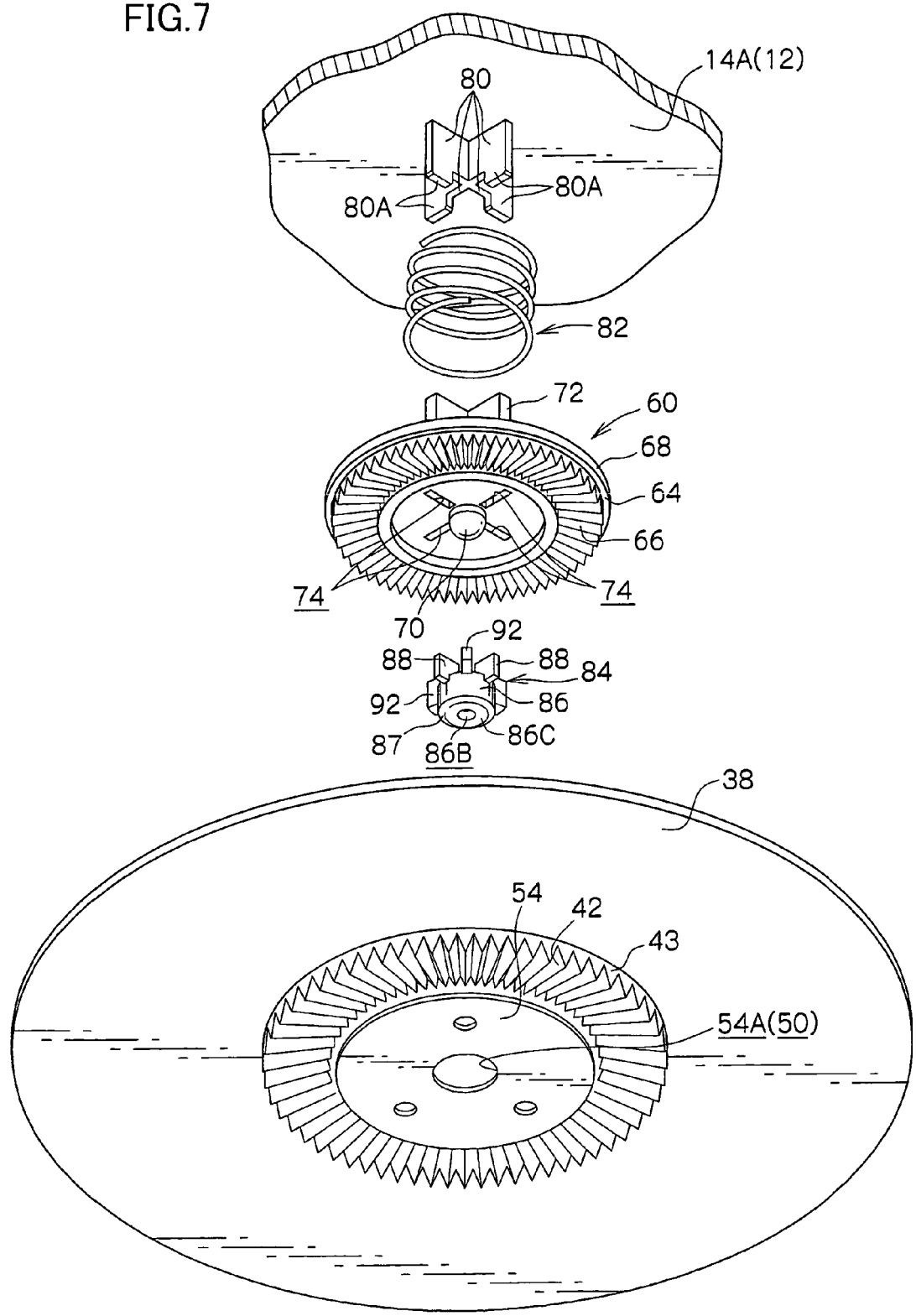
FIG. 7 is an exploded perspective view, seen from below, showing the brake structure which structures the recording tape cartridge relating to the embodiment of the present invention.

As shown in FIGS. 7 and 8, the reel gear 42 is provided at an outer peripheral vicinity of a lower face (outer face) of the base portion 36 of the reel hub 32. The reel gear 42 is formed in an annular shape which is coaxial with the reel 28 as a whole. The reel gear 42 is meshable with a driving gear 108 which is provided at a distal end of a rotating shaft 100 (described later) of a drive device. Tooth peaks of this reel gear 42 protrude downward further than a lower face of the lower flange 38, and tooth bases of the reel gear 42 are disposed at an upper side relative to the lower face of the lower flange 38. Radial direction outer side end portions of the teeth extend to the tooth bases from tooth height direction central portions and are joined by a taper portion 43, which is continuous with the lower flange 38.

As shown in FIGS. 6 and 8, an engaging gear 44 is provided at an outer peripheral vicinity of an upper face (inner face) of the base portion 36 of the reel hub 32, to serve as an engaging portion. The engaging gear 44 is formed in an annular shape which is coaxial with the reel 28 as a whole, and is formed on an annular seat portion 46, which protrudes by a small amount from the inner face of the base portion 36. The engaging gear 44 is meshable with a brake gear 66 of a braking member 60, which will be described later.

Standing ribs 48 are plurally provided at equal intervals in the circumferential direction at a radial direction outer side of the engaging gear 44 (and the seat portion 46). The standing ribs 48 are respectively continuous with an inner face of the tubular portion 34, running along an axial direction of the reel 28, and the upper face of the base portion 36. Because of the presence of these standing ribs 48, the engaging gear 44 is disposed at a radial direction inner side relative to the reel gear 42 (i.e., the engaging gear 44 is provided along a circular circumference with a smaller diameter than the reel gear 42 and, in the present embodiment, partially overlaps with the reel gear 42). Functioning of the standing ribs 48 will be described later, together with the braking member 60.

At an axial center portion of the base portion 36 of the reel hub 32, a through-hole 50 is formed to penetrate through the base portion 36. A short tubular-form clutch boss portion 52 is provided standing from the upper face of the base portion 36 along an edge portion of the through-hole 50. The clutch boss portion 52 will be described later, together with a clutch member 84.

Portions of the reel 28 described above, excluding the upper flange 40, are formed integrally by resin-molding. A reel plate 54, which is an annular plate formed of a magnetic material, is coaxially and integrally provided at the lower face of the base portion 36 of the reel hub 32 by insert-molding at an inner side of the reel gear 42. An axial center portion of the reel plate 54 is formed as a through-hole 54A. An internal diameter of the through-hole 54A is set to be slightly smaller than an internal diameter of the through-hole 50.

The reel 28 is accommodated in the case 12 so as to be placed on the annular rib 22 at times of non-use. Specifically, as shown in FIG. 4, an outer side portion of the taper portion 43 at the base portion 36 of the reel 28 (a vicinity of an inner edge of the lower flange 38) abuts against an upper end face of the annular rib 22. An upper end inner edge portion of the annular rib 22 is formed as a tapering surface 22A, which corresponds with the taper portion 43. Thus, radial direction movement of the reel 28 is restricted.

In this state, the reel 28 is disposed wholly inside the case 12, and the reel gear 42 and reel plate 54 are exposed through the gear aperture 20 (see FIG. 1B). That is, the reel gear 42 faces out of the case 12 through the gear aperture 20, without protruding from the outer face (lower face) of the lower case 16. Moreover, the through-hole 50 faces the gear aperture 20 through the through-hole 54A of the reel plate 54.

Thus, operation of the reel 28 from outside the case 12, which is to say chucking (retention) and rotational driving, is enabled. In this state, a restricting rib 56, which is provided standing from the ceiling plate 14A, enters into an upper portion of the tubular portion 34 of the reel 28. The restricting rib 56 is a structure whose outer peripheral face is close to the inner peripheral face of the short tubular portion 40A of the upper flange 40, and which prevents looseness of the reel 28 in the case 12.

The recording tape cartridge 10 is equipped with a braking structure for blocking rotation of the reel 28 at times of non-use. This braking structure is provided with the braking member 60, which serves as a brake member. As shown in FIGS. 4 and 5, the braking member 60 includes a main body portion 62. The main body portion 62 is formed substantially in the form of a circular tube having a base, which opens downward, by a tubular portion 62A and a circular plate portion 62B. The tubular portion 62A is formed in a short tubular form, and the circular plate portion 62B closes off an upper end of the tubular portion 62A. An outer diameter of the tubular portion 62A is smaller than an inner diameter of the engaging gear 44 (and the seat portion 46), and an inner diameter of the tubular portion 62A is larger than an outer diameter of the clutch boss portion 52.

A ring portion 64, which is formed in an annular shape, is provided extending to the radial direction outer side from an axial direction intermediate portion of an outer peripheral portion of the main body portion 62 (the tubular portion 62A), along the whole circumference thereof. The brake gear 66 is provided at a lower face of the ring portion 64, along the whole circumference thereof. That is, the brake gear 66 is formed in an annular shape as a whole. This brake gear 66 is structured to be capable of meshing with the engaging gear 44 of the reel 28.

Inner end portions of teeth that structure the brake gear 66 are joined by the tubular portion 62A. Outer end portions of the teeth, which are in a free-standing state, are disposed slightly to the radial direction inner side relative to an outer edge of the ring portion 64. In other words, the ring portion 64 juts out to the radial direction outer side relative to the brake gear 66.

More specifically, the outer diameter of the ring portion 64 is slightly larger than the outer diameter of the engaging gear 44, and the outer diameter of the brake gear 66 is slightly smaller than the outer diameter of the engaging gear 44. Further, an annular reinforcing rib 68 is provided standing at an upper face of the ring portion 64, along an outer edge portion thereof. Thus, rigidity of the ring portion 64 (and of the brake gear 66) is ensured.

A rubbing protrusion portion 70 is provided protruding from an axial core portion of a lower face of the circular plate portion 62B of the main body portion 62 (at the inner side of the tubular portion 62A). A distal end portion of the rubbing protrusion portion 70 is formed in a substantially spherical surface shape, so as to substantially make point contact with the later-described clutch member 84. The distal end of the rubbing protrusion portion 70 is disposed slightly upward relative to a lower end face of the tubular portion 62A (at the inner side of the tubular portion 62A).

An X-form protrusion 72 is provided standing from an upper face of the circular plate portion 62B. An insertion channel 72A, which is formed substantially in a cross shape in plan view, is formed at an interior portion of the X-form protrusion 72. Through-holes 74 are formed in the circular plate portion 62B, passing through the circular plate portion 62B in a plate thickness direction thereof. The through-holes 74 are formed so as to communicate with radial direction outer side portions of the insertion channel 72A, which is formed in the cross shape in plan view, excluding an axial center portion of the insertion channel 72A (which is an intersection portion). The through-holes 74 are divided into four parts, which are respectively formed in rectangular shapes (see FIG. 7). Thus, the through-holes 74 are each located adjacent to the radial direction outer side of the rubbing protrusion portion 70, and open to the inside of the tubular portion 62A.

An annular rib 76 is provided standing from an outer peripheral portion of the upper end of the main body portion 62. The upper face of the circular plate portion 62B between the rib 76 and the X-form protrusion 72 serves as a spring-receiving surface 78. The spring-receiving surface 78 abuts against one end portion of a compression coil spring 82, which is described later.

The braking member 60 described above is inserted into the tubular portion 34 of the reel hub 32 so as to be movable in the vertical direction (the axial direction of the reel 28) and substantially coaxial with the reel hub 32. Thus, because the braking member 60 is movable in the vertical direction, the braking member 60 can attain a position at which the brake gear 66 of the braking member 60 meshes with the engaging gear 44 of the reel hub 32 (a rotation-locking position) and a position at which this meshing is released (a rotation-enabling position).

Here, length of the tubular portion 62A is determined such that a lower end face of the tubular portion 62A does not abut against the base portion 36 when the braking member 60 is disposed at the rotation-locking position (see FIG. 4).

An X-form rib 80 (see FIGS. 6 and 7) is provided protruding downward from the ceiling plate 14A of the case 12. The X-form rib 80 enters into the insertion channel 72A of the X-form protrusion 72 of the braking member 60. The X-form rib 80 has a baffle (detent) form, which is formed as two thin plates which are intersected so as to be perpendicular to one another. With this structure, rotation of the braking member 60 relative to the case 12 is blocked by engagement of the X-form protrusion 72 (i.e., the channel walls of the insertion channel 72A) with the X-form rib 80.

Accordingly, in the state in which the brake gear 66 of the braking member 60 is meshed with the engaging gear 44 of the reel hub 32, the braking member 60 blocks rotation of the reel 28. Here, the X-form rib 80 is maintained in a state of being inserted in the insertion channel 72A over the whole of a movement stroke of the braking member 60 in the vertical direction. Thus, this is a structure which provides a function of guiding movement directions of the braking member 60 to the vertical direction.

The X-form rib 80 further includes protruding plates 80A, which are respectively provided extending downward from locations corresponding to the through-holes 74 of the braking member 60 at a lower end portion of the X-form rib 80. The protruding plates 80A are structures whose widths (lengths thereof in the radial direction of the braking member 60), which correspond to length dimensions of the through-holes 74, can be interposed at respectively different ones of the through-holes 74 and inserted into the respective through-holes 74.

These protruding plates 80A are disposed inside the insertion channel 72A when the braking member 60 is disposed at the rotation-locking position, and when the braking member 60 is disposed at the rotation-enabling position, the protruding plates 80A enter into the respective through-holes 74 and protrude (through the through-holes 74) from the lower face of the circular plate portion 62B. Thus, as a result of the protruding plates 80A being provided extending from the X-form rib 80, in addition to blocking rotation of the braking member 60 relative to the case 12, the protruding plates 80A greatly increase an engagement amount (insertion depth) of the X-form rib 80 with the braking member 60 and suppress inclination of the braking member 60 relative to the case 12.

The X-form rib 80 with this structure also improves guidance of the braking member 60 in the vertical direction. In the present embodiment, an engagement amount, in the axial direction, of the X-form rib 80 including the protruding plates 80A with the braking member 60 that is disposed at the rotation-locking position is specified to be significantly larger than the whole of the movement stroke of the braking member 60 (see FIG. 4).

The braking member 60 is structured such that, when the braking member 60 is disposed at the rotation-locking position, radial direction movement thereof is restricted by the standing ribs 48 of the reel 28, and such that when the braking member 60 is disposed at the rotation-enabling position, there is no risk of interference between the braking member 60 and the standing ribs 48, which rotate together with the reel 28.

Therefore, the standing ribs 48 are disposed close to the reinforcing rib 68 of the ring portion 64 when the braking member 60 is disposed at the rotation-locking position (see FIG. 4), but an upper portion of the standing ribs 48 is cut away such that a separation thereof from the reinforcing rib 68 is at least a predetermined value when the braking member 60 is disposed at the rotation-enabling position (see FIG. 5).

Thus, the reel 28 is not only restricted in movement directly by the case 12 (by the annular rib 22 including the tapering surface 22A and by the restricting rib 56), but movement of the reel 28 relative to the case 12 in the radial direction is restricted via the braking member 60 in the vicinity of the center of gravity of the reel 28. Thus, the case 12 is made to be stably loadable even in a vertical-type drive device (in which the axial direction of the reel 28 is a horizontal direction).

The compression coil spring 82, which serves in a broad sense as an urging structure, is disposed between the spring-receiving surface 78 of the braking member 60 and the ceiling plate 14A. The one end portion of the compression coil spring 82 abuts against the spring-receiving surface 78 and another end portion thereof abuts against the ceiling plate 14A. The other end portion is disposed at an inner side of an annular wall portion 83, which is provided protruding from the ceiling plate 14A at an outer side of the X-form rib 80, such that the compression coil spring 82 will not be displaced in radial directions thereof.

With this structure, the braking member 60 is urged downward by urging force of this compression coil spring 82, the brake gear 66 is ordinarily meshed with the engaging gear 44, and the brake gear 66 reliably prevents undesired rotation of the reel 28 (i.e., the braking member 60 is disposed at the rotation-locking position). Also due to this urging force, the reel 28 whose engaging gear 44 is meshed with the braking member 60 is urged downward and abuts against the annular rib 22 such that the reel 28 is not loose inside the case 12.

Further, as shown in FIGS. 4 to 7, the recording tape cartridge 10 is equipped with the clutch member 84, which serves as a "release member" which is operated from outside the recording tape cartridge 10 when the state of locking of the reel 28 by the braking member 60 is to be released. The clutch member 84 is disposed between the base portion 36 of the reel 28 and the braking member 60. Below, the clutch member 84 will be described more specifically.

The clutch member 84 includes a clutch main body 86, which is formed in a substantially circular column form. An outer diameter of the clutch main body 86 is slightly smaller than the inner diameter of the through-hole 54A of the reel plate 54, and thus the inner diameter of the through-hole 50 corresponding to an inner diameter of the clutch boss portion 52. An axial direction upper end face of the clutch main body 86, which is flat, is made to serve as a rubbing surface 86A, which continuously abuts against the rubbing protrusion portion 70 of the braking member 60.

An incised hole 86B is formed in the clutch main body 86 to open downward. A lower end face of surroundings of the incised hole 86B, which is flat, is made to serve as an push-operated surface 86C.

Thus, the clutch member 84 has a structure in which, when the push-operated surface 86C of the clutch member 84 is pushed, as described in more detail later, the clutch member 84 moves upward against the urging force of the compression coil spring 82 and moves the braking member 60 to the rotation-enabling position.

Figure 9A:
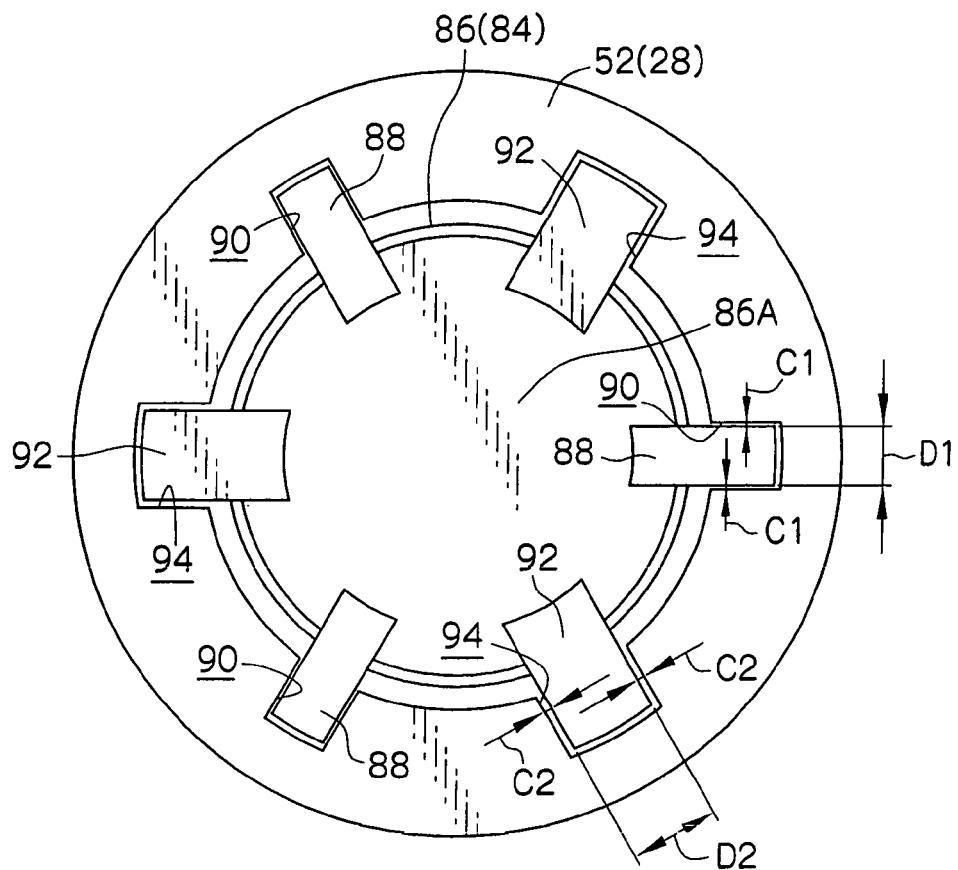
FIG. 9A is a plan view showing details of a state of assembly, to the reel, of a clutch member which structures the recording tape cartridge relating to the embodiment of the present invention.

The clutch member 84 is provided with rotation-limiting ribs 88, which protrude to the radial direction outer side relative to an outer peripheral face of the clutch main body 86. The rotation-limiting ribs 88 are plurally provided (three in the present embodiment) at equal intervals in the circumferential direction of the clutch main body 86. The rotation-limiting ribs 88 are provided in a radiating form in plan view. Each rotation-limiting rib 88 protrudes upward relative to the rubbing surface 86A so as to extend between (respectively join with) an upper end surface of the clutch main body 86 around the rubbing surface 86A and the outer peripheral face of the clutch main body 86 in the vicinity of that upper end surface (as shown in FIG. 7 and FIG. 9A).

The rotation-limiting ribs 88 enter into rotation-restricting channels 90, which are respectively recessed from inner edge portions of the clutch boss portion 52. That is, three of the rotation-restricting channels 90 are provided at equal intervals in the circumferential direction of the clutch boss portion 52. Each rotation-restricting channel 90 opens upward at the upper end of the clutch boss portion 52. Thus, the clutch member 84 is enabled to move vertically while being guided, by the rotation-limiting ribs 88, in the rotation-restricting channels 90 of the clutch boss portion 52.

Further, even when the clutch member 84 moves upward and the braking member 60 is disposed at the rotation-enabling position, the rotation-limiting ribs 88 are maintained in the state of being inserted in the rotation-restricting channels 90 of the clutch boss portion 52. Therefore, the clutch member 84 is relatively non-rotatable with respect to the reel 28; that is, the clutch member 84 80 has a structure which rotates integrally with the reel 28.

Further, the rotation-restricting channels 90 are closed off at a lower end portion of the clutch boss portion 52.

Therefore, disengagement of the clutch member 84 from the reel hub 32 can be blocked by the rotation-limiting ribs 88 and the rotation-restricting channels 90. In the present embodiment, the clutch member 84 is also provided with seating ribs 92 separately from the rotation-limiting ribs 88. The seating ribs 92 block disengagement of the clutch member 84 from the reel hub 32, and are provided for causing the clutch main body 86 to abut against the braking member 60 that is disposed at the rotation-locking position.

The seating ribs 92 are plurally provided at equal intervals in the circumferential direction of the clutch main body 86 for a total, in the present embodiment, of three seating ribs 92 at circumferential direction intermediate portions between the rotation-limiting ribs 88. Similarly to the rotation-limiting ribs 88, each seating rib 92 protrudes upward and to the radial direction outer side so as to extend between an upper end surface of the clutch main body 86 around the rubbing surface 86A and the outer peripheral face in the vicinity of that upper end surface (as shown in FIG. 7 and FIG. 9A). The seating ribs 92 are provided in a radiating form in plan view.

The seating ribs 92 enter into stopper channels 94, which are respectively recessed from inner edge portions of the clutch boss portion 52. That is, the stopper channels 94 are provided at equal intervals in the circumferential direction of the clutch boss portion 52, at circumferential direction intermediate portions between the rotation-restricting channels 90.

The stopper channels 94 open upward at the upper end of the clutch boss portion 52. Upper faces of floor portions which close off lower end portions of the stopper channels 94 are made to serve as stopper faces 94A. The seating ribs 92 are formed such that when the braking member 60, whose rubbing protrusion portion 70 continuously abuts against the clutch main body 86, is disposed at the rotation-locking position, (lower end faces of) the seating ribs 92 abut (are seated) at the stopper faces 94A.

Figure 9B:
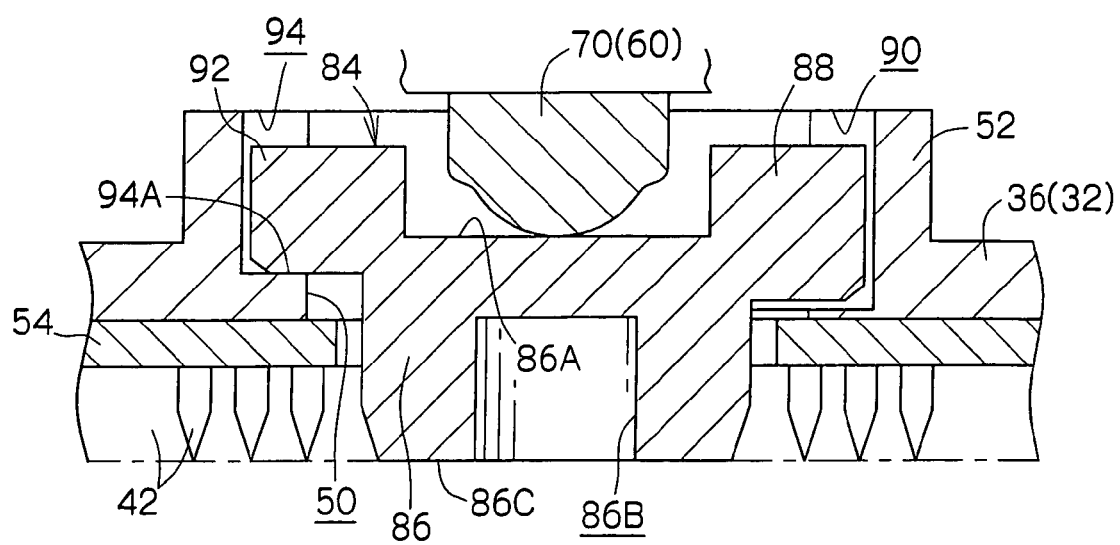
FIG. 9B is a sectional view showing details of the state of assembly to the reel of the clutch member which structures the recording tape cartridge relating to the embodiment of the present invention.

Here, the clutch main body 86, rotation-limiting ribs 88 and seating ribs 92 of the clutch member 84 are formed integrally by resin-molding. Hence, as shown in FIG. 9B, heights of upper end faces of the rotation-limiting ribs 88 and the seating ribs 92 coincide with one another, while the lower end faces of the rotation-limiting ribs 88 are disposed lower than the lower end faces of the seating ribs 92.

Meanwhile, upper ends of the rotation-restricting channels 90 and the stopper channels 94, which respectively open at the upper end of the clutch boss portion 52, coincide, while floor faces of the rotation-restricting channels 90 are disposed lower than the stopper faces 94A of the stopper channels 94. In other words, the rotation-limiting ribs 88 are longer in the vertical direction than the seating ribs 92, and the rotation-restricting channels 90 are deeper in the vertical direction than the stopper channels 94.

This is because, by making an engageable amount of the rotation-limiting ribs 88 with the clutch boss portion 52 (an amount by which the rotation-limiting ribs 88 can be inserted into the rotation-restricting channels 90) larger, a reactive force applied from the reel 28 when the reel 28 rotates is moderated, guidance when the clutch member 84 moves vertically is improved, and looseness of the clutch member 84 when the braking member 60 is disposed at the rotation-enabling position is suppressed.

Furthermore, as shown in FIG. 9A, in order to further suppress such looseness, a clearance C1 at each circumferential direction side between the rotation-limiting ribs 88 and the rotation-restricting channels 90 is set to be smaller to an extent such that sliding resistance is not excessive when the clutch member 84 moves vertically. Further still, thicknesses of the rotation-limiting ribs 88 (plate thicknesses thereof in the circumferential direction of the clutch member 84) are set to be thinner within a range which will not cause problems in regard to strength. A structure with high dimensional accuracy is provided by resin-molding. Therefore, the aforementioned clearance C1 can be made even smaller in this structure. In the present embodiment, a thickness t1 of the rotation-limiting ribs 88 is 1.5 mm and the clearance C1 is 0.05 mm.

In addition, thicknesses of the seating ribs 92 are set to be larger than thicknesses of the rotation-limiting ribs 88. Accordingly, the seating ribs 92 are a structure which ensures sufficient stiffness with respect to the urging force of the compression coil spring 82, which acts via the braking member 60, when the seating ribs 92 abut against the stopper faces 94A. Meanwhile, with regard to portions of the base portion 36 of the reel hub 32 at which the stopper faces 94A, against which the seating ribs 92 abut, are formed, because the stopper channels 94 are shallow, plate thickness is large, and sufficient stiffness with respect to the urging force of the compression coil spring 82 is ensured.

Because the seating ribs 92 are thicker, resin flow characteristics during molding are relatively poor thereat. However, because, as mentioned above, the seating ribs 92 are shorter than the rotation-limiting ribs 88, the poor flow characteristics are unlikely to have any effect (i.e., the flow characteristics are unlikely to exert effects on other portions) in this structure. Further, the seating ribs 92, which have worse dimensional accuracy than the rotation-limiting ribs 88 which are formed to be thick, are a structure which is not required for the function of suppressing looseness of the clutch member 84, and a circumferential direction clearance C2 between the seating ribs 92 and the stopper channels 94 is set to be significantly larger than the aforementioned clearance C1.

Therefore, the seating ribs 92 are a structure in which, when the clutch member 84 moves vertically, sliding resistance between the seating ribs 92 and the clutch boss portion 52 does not occur or is greatly reduced. In the present embodiment, a thickness t2 of the seating ribs 92 is 2 mm, and the clearance C2 is 0.1 mm.

Heights (upper end positions) of the rotation-limiting ribs 88 and the seating ribs 92 are determined so as not to interfere with the protruding plates 80A of the case 12, which pass through the circular plate portion 62B of the braking member 60 when the clutch member 84 moves upward and moves the braking member 60 to the rotation-enabling position (see FIG. 5).

In the state in which the rotation-limiting ribs 88 of the clutch member 84 described above are inserted in respectively different ones of the rotation-restricting channels 90 and the seating ribs 92 of the clutch member 84 are inserted in respectively different ones of the stopper channels 94, the clutch main body 86 is inserted through the through-hole 50 and the through-hole 54A. Hence, the seating ribs 92 are continuously retained in the state of abutting against the stopper faces 94A by the urging force of the compression coil spring 82, which acts through the braking member 60. In this state, the lower end faces of the rotation-limiting ribs 88 are slightly separated from floor faces of the rotation-restricting channels 90 (see FIG. 9B), and a vertical direction position of the push-operated surface 86C is a position which is slightly higher (by 0.1 mm in the present embodiment) than tooth peaks of the reel gear 42.

Thus, in accordance with the operation of meshing the reel gear 42 with the driving gear 108 of the drive device, this clutch member 84 is pushed by a release surface 114A of the drive device and moves upward. Before this function is described, the rotating shaft 100 of the drive device will be described.

Figure 10:
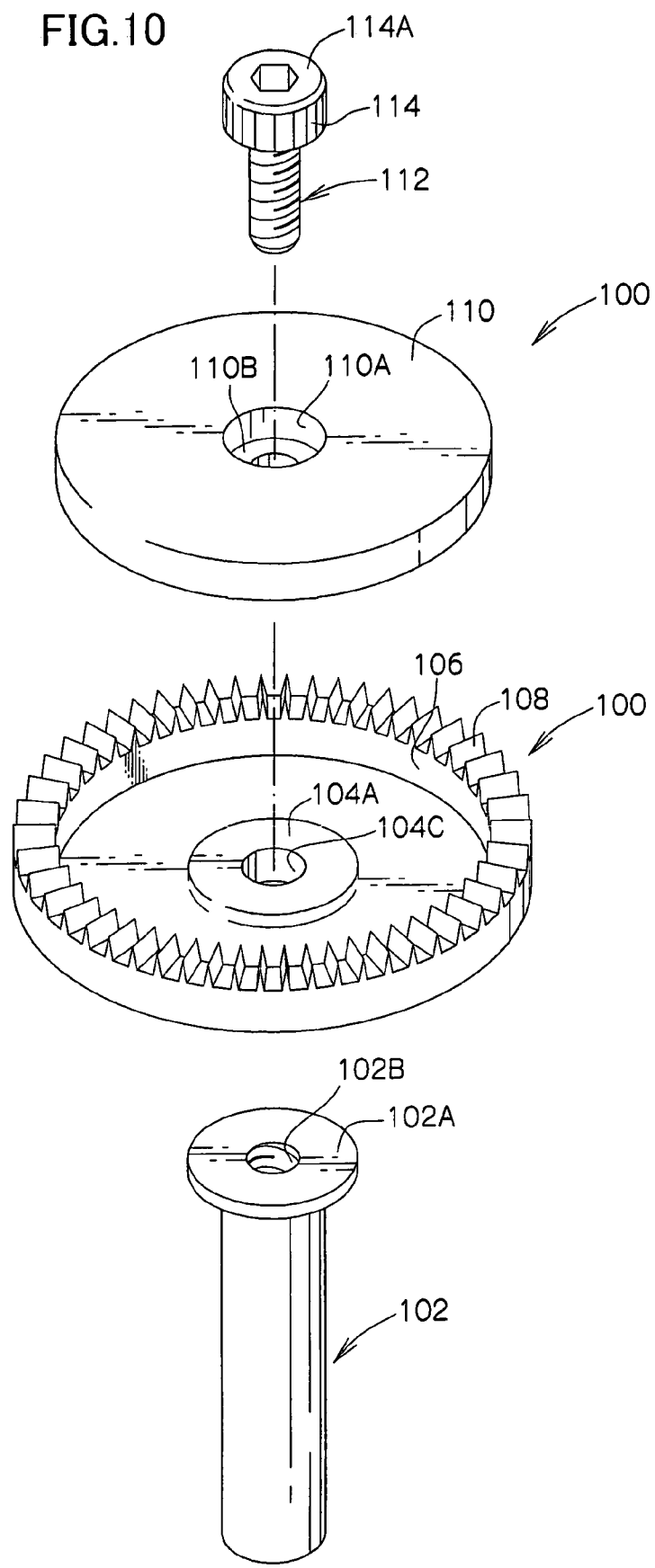
FIG. 10 is an exploded perspective view of a rotation shaft of a drive device at which the recording tape cartridge relating to the embodiment of the present invention is loaded.
Figure 11:
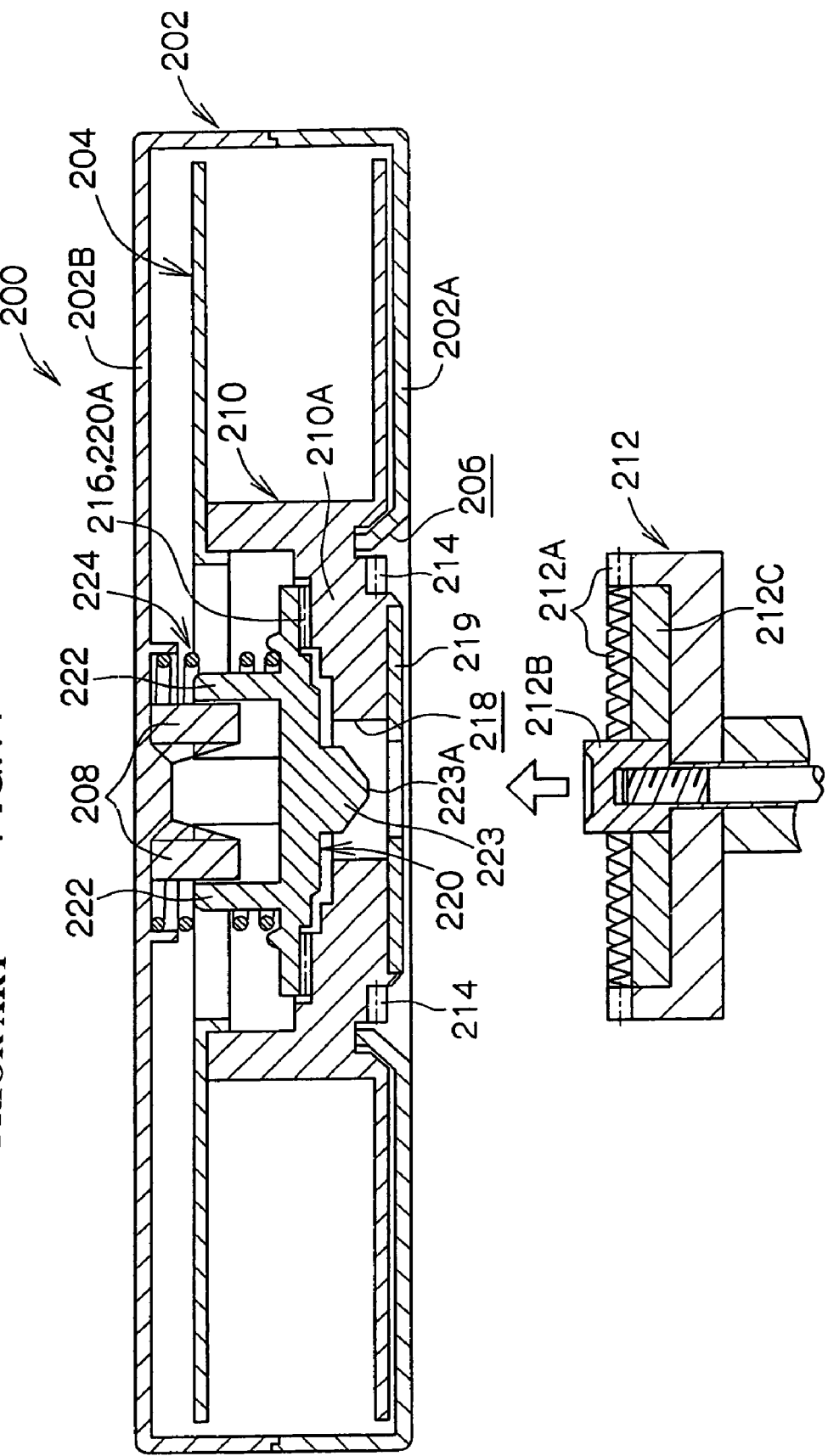
FIG. 11 is a sectional view showing a conventional recording tape cartridge.
Figure 12:
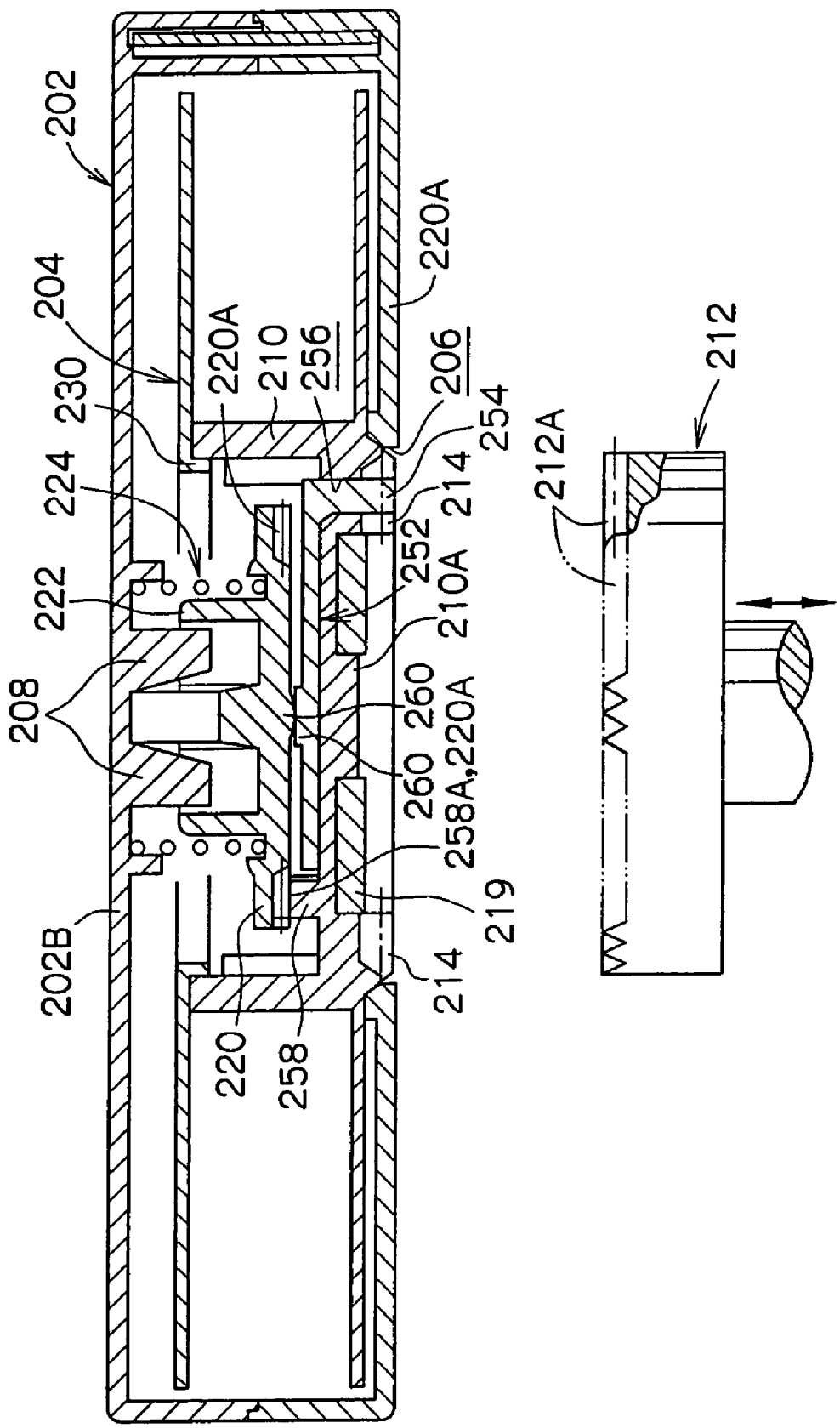
FIG. 12 is a sectional view showing a second conventional recording tape cartridge.

As shown in the exploded perspective view in FIG. 10, the rotating shaft 100 is equipped with a rotating spindle 102. At an upper end of the rotating spindle 102, a flange portion 102A is integrally formed to protrude to the radial direction outer side of the rotating spindle 102. A screw hole 102B, which opens upward, is formed at an axial center portion of the rotating spindle 102. A circular plate-form rotating table 104 is fixed to the upper end of the rotating spindle 102.

An annular protrusion portion 106 is provided protruding from an upper face of the rotating table 104 along an outer peripheral portion thereof. The driving gear 108 is formed at an upper face of the annular protrusion portion 106. The driving gear 108 is meshable with the reel gear 42 of the recording tape cartridge 10. As shown by sectional views in FIG. 4, etc., an upper face side of an axial center portion of the rotating table 104 is formed as a slightly protruded magnet-holding portion 104A, a lower face side of the same is formed as a fitting recess portion 104B, which is recessed to correspond with the flange portion 102A, and a through-hole 104C passes through the axial center portion of the rotating table 104.

A magnet 110, which is formed in a substantially circular plate form, is coaxially disposed at a radial direction inner side of the annular protrusion portion 106 (and the driving gear 108) of the rotating table 104. A through-hole 110A is formed at an axial center portion of the magnet 110. A step portion 110B, which faces upward, is formed at a substantially central portion in the axial direction of the through-hole 110A. Thus, the through-hole 110A has a larger diameter above the step portion 110B and a smaller diameter below the step portion 110B.

The rotating shaft 100 is structured such that the flange portion 102A of the rotating spindle 102 fits in at the fitting recess portion 104B of the rotating table 104, and the magnet 110 is placed on the magnet-holding portion 104A. In this state, a tap bolt 112 is screwed into the screw hole 102B and a head portion 114 of the tap bolt 112 is engaged at the step portion 110B. Thus, the rotating table 104 and the magnet 110 are gripped between the rotating spindle 102 and the head portion 114, and thus fixed to the rotating spindle 102. As a result, the rotating shaft 100 is a structure which integrally rotates as a whole.

The tap bolt 112 is set to be a bolt with a hexagonal hole which is fabricated of metal, and structures a "releasing portion" of the present invention. An upper end face of the head portion 114 of the tap bolt 112 (around the hexagonal hole) is formed to be flat, and serves as the release surface 114A which abuts against the push-operated surface 86C of the clutch member 84. The release surface 114A is finished to a degree of flatness which is equal to or greater than a degree of flatness of an upper face of the magnet 110.

Hence, when the recording tape cartridge 10 is loaded in the drive device, the recording tape cartridge 10 moves downward and relatively approaches the rotating shaft 100. Consequently, with this structure, the driving gear 108 of the rotating shaft 100 meshes with the reel gear 42 which is exposed through the gear aperture 20. In addition, when the reel plate 54 is slightly apart from the magnet 110 of the rotating shaft 100, the reel plate 54 is attracted and the reel 28 is retained at the rotating shaft 100.

When the rotating shaft 100 moves relatively upward with respect to the case 12 in accordance with this meshing operation, the push-operated surface 86C of the clutch member 84 is pushed by the release surface 114A of the tap bolt 112 (a portion of the rotating shaft 100 which intrudes at a radial direction inner side relative to the reel gear 42) and the clutch main body 86 moves upward, such that the braking member 60 moves toward the rotation-enabling position.

Thus, the reel 28 is structured such that, in accordance with the operation of meshing the driving gear 108 with the reel gear 42, the reel 28 rises within the case 12 (i.e., the lower flange 38 is moved away from the annular rib 22) against the urging force of the compression coil spring 82, the state of blocking of rotation by the braking member 60 is released, and the reel 28 becomes rotatable within the case 12.

When the reel gear 42 has meshed with the driving gear 108, the state of abutting of the head portion 114 against the push-operated surface 86C of the clutch member 84 is maintained, and the clutch member 84 is structured to hold the braking member 60 at the rotation-enabling position. Hence, during rotation of the reel 28, there is no relative rotation between the clutch member 84, which rotates integrally with the reel 28, and the rotating shaft 100, which drives the reel 28. Thus, in this structure, there is no sliding contact between the push-operated surface 86C and the release surface 114A. However, the rubbing surface 86A of the clutch member 84 and the rubbing protrusion portion 70 of the braking member 60, which is non-rotatable relative to the case 12, slidingly contact one another.

Note that, in the clutch member 84 described above, the upper side portion of the clutch main body 86, which includes the push-operated surface 86C that abuts against the braking member 60 and which is disposed in the tubular portion 34, corresponds to a "main body portion" of the present invention, and the push-operated surface 86C which faces the gear aperture 20 to be operable by the rotating shaft 100 corresponds to an "operation portion" of the present invention.

Next, operation of the present embodiment will be described.

With the recording tape cartridge 10 of the structure described above, at times of non-use, because of the urging force of the compression coil spring 82, the braking member 60 is disposed at the rotation-locking position and the brake gear 66 is meshed with the engaging gear 44. As a result, rotation of the reel 28 relative to the case 12 is blocked. At such times, the reel gear 42 of the reel 28 is exposed through the gear aperture 20, and the clutch main body 86 of the clutch member 84 is inserted through the through-hole 50 and the through-hole 54A to face the gear aperture 20.

Now, when the magnetic tape T is to be used, the recording tape cartridge 10 is loaded into a bucket (not shown) of a drive device in the direction of arrow A. Hence, when the recording tape cartridge 10 has been loaded to a predetermined depth in the bucket, the bucket descends, and the rotating shaft 100 of the drive device relatively approaches (moves upward) toward the gear aperture 20 of the case 12 and retains the reel 28. Specifically, the rotating shaft 100 attracts and retains the reel plate 54 with the magnet 110, and the driving gear 108 of the rotating shaft 100 is meshed with the reel gear 42.

In accordance with this meshing of the reel gear 42 with the driving gear 108, which is to say the relative movement of the rotating shaft 100 in the axial direction relatively toward the case 12, the release surface 114A (the tap bolt 112) of the rotating shaft 100 abuts against the push-operated surface 86C of the clutch member 84, and the clutch member 84 is pushed upward against the urging force of the compression coil spring 82.

Accordingly, the braking member 60, whose rubbing protrusion portion 70 abuts against the clutch member 84, also moves upward, and the meshing between the brake gear 66 of the braking member 60 and the engaging gear 44 is released. Thus, the braking member 60 reaches a relative rotation-enabling position with respect to the reel 28.

When the rotating shaft 100 relatively moves further upward, the reel 28 lifts up both the clutch member 84 and the braking member 60 (without altering the relative position thereof), against the urging force of the compression coil spring 82, and the braking member 60 reaches the absolute rotation-enabling position (relative to the case 12). In addition, the lower flange 38 moves away from the annular rib 22 (the tapering surface 22A). Thus, as described above, the reel 28 is raised in the case 12 and becomes rotatable in a state of non-contact with interior surfaces of the case 12.

Further, when the bucket, which is to say the recording tape cartridge 10, descends in the drive device, the respective positioning pins of the drive device enter into the positioning holes 24 and 26 of the case 12, and the positioning surfaces of the drive device abut against the positioning surfaces 24A and 26A of the case 12. Thus, the recording tape cartridge 10 is positioned in horizontal and vertical directions relative to the drive device.

Then, a drawing-out pin (not shown) of drawing-out means of the drive device engages with the engaging recess portion 30A of the leader block 30, and the leader block 30 is taken out from the case 12 and guided to the winding reel of the drive device. The leader block 30 is then fitted into the winding reel and the circular arc wall 30B of the leader block 30 structures a portion of the winding surface around which the magnetic tape T is to be wound.

In this state, when the leader block 30 rotates integrally with the winding reel, the magnetic tape T is wound round a reel hub of the winding reel while being sequentially drawn out from the case 12 through the aperture 18. At this time, the reel 28 of the recording tape cartridge 10 rotates synchronously with the winding reel, as a result of rotation force of the rotating shaft 100 being transmitted by the driving gear 108 that is meshed with the reel gear 42.

Hence, recording of information to the magnetic tape T and/or replaying of information that has been recorded on the magnetic tape T is carried out by a recording/replaying head which is disposed along a predetermined tape path of the drive device. At this time, the rubbing protrusion portion 70 of the braking member 60, which is non-rotatable relative to the case 12, rubs against (the rubbing surface 86A of) the clutch main body 86 of the clutch member 84, which rotates together with the reel 28 relative to the case 12.

Subsequently, when the magnetic tape T has been wound back to the reel 28 again and the leader block 30 has been retained in the vicinity of the aperture 18 of the case 12, the bucket in which the recording tape cartridge 10 is loaded rises. Correspondingly, the meshing of the reel gear 42 with the driving gear 108 is released, and the abutting of the release surface 114A against the push-operated surface 86C of the clutch member 84 is released. The clutch member 84 is moved downward together with the braking member 60 (while maintaining the abutting state therebetween) by the urging force of the compression coil spring 82.

Hence, the seating ribs 92 of the clutch member 84 abut against the stopper faces 94A, and the brake gear 66 of the braking member 60 meshes with the engaging gear 44. In other words, the braking member 60 returns to the rotation-locking position for blocking rotation of the reel 28 relative to the case 12.

Further, in accordance with the operation of moving the braking member 60 and the clutch member 84 by the urging force of the compression coil spring 82, the reel 28 also moves downward and returns to the initial state thereof, in which the lower flange 38 abuts against the annular rib 22 and the reel gear 42 is exposed through the gear aperture 20. In this state, the recording tape cartridge 10 is ejected from the bucket.

Now, with this recording tape cartridge 10, the upper side portion of the clutch main body 86, which corresponds to the main body portion of the clutch member 84, is disposed at the radial direction inner side relative to the engaging gear 44. Consequently, in this structure in which the clutch member 84 is provided, a structure in which the engaging gear 44 is formed in a continuous annular form is realized. Accordingly, a function of centering of the braking member 60 by the engaging gear 44 is improved, and riding up of the braking member 60 on the tooth peaks of the engaging gear 44 during assembly of the braking member 60 is prevented. Moreover, a meshing amount of the brake gear 66 with the engaging gear 44 is increased, and braking effect of the reel 28 by the braking member 60 is improved. Therefore, it is possible to reduce an engagement amount per tooth between the brake gear 66 and engaging gear 44, to shorten the release stroke, to reduce urging force of the compression coil spring 82, and/or to reduce strength requirements for each component (while maintaining a generous margin of strength).

Further, with this recording tape cartridge 10, because the clutch main body 86 of the clutch member 84 faces the gear aperture 20 at the radial direction inner side relative to the reel gear 42, there is no need to provide non-continuous portions at the reel gear 42 for operating the release member (i.e., portions corresponding to the insertion through-holes 256 in the conventional recording tape cartridge 250), and a structure in which the reel gear 42 is formed in a continuous annular form is realized. Accordingly, an improvement in transmission of torque to the reel 28 from the driving gear 108 and assurance of strength of the reel gear 42 with respect to this torque are anticipated.

Further still, because the portion that abuts against the push-operated surface 86C when the reel 28 in the rotation-locked state is to be released is not the driving gear 108, the movement stroke of the clutch member 84 is not limited by the tooth heights of the reel gear 42 (and the driving gear 108), and it is possible to ensure an adequate release stroke.

In addition, at a time of the above-described lock-releasing, because the flat head portion 114 presses against the flat push-operated surface 86C in a state of surface contact, wearing is not caused at the resin push-operated surface 86C by this pushing.

Moreover, because the clutch member 84 rotates together with the rotating shaft 100 at times of rotation of the reel 28, wearing is not caused at the push-operated surface 86C in accordance with the rotation either.

Consequently, the release stroke is not reduced by wearing of the clutch member 84 and, in the present embodiment, the release stroke is set to be substantially the same as the tooth heights of the reel gear 42. Obviously, wearing does not occur at the metallic head portion 114 either.

Further yet, because the clutch member 84 passes through the through-hole 50 and a portion of the clutch main body 86 is disposed at a thick plate portion of the base portion 36, an amount of protrusion of the base portion 36 to the upper face side thereof is suppressed. Consequently, a structure in which the braking member 60, which continuously abuts at the rubbing surface 86A, is disposed at a position near the base portion 36 and a height of the engaging gear 44 is suppressed to a low level is realized.

Accordingly, the location of meshing of the brake gear 66 of the braking member 60 with the engaging gear 44 of the reel 28 is near the center of gravity of the reel 28, and braking effect of the reel 28 by the braking member 60 is further improved. That is, the braking member 60 consistently blocks rotation of the reel 28. Furthermore, the thickness of the seat portion 46 at which the engaging gear 44 is formed is reduced, and molding characteristics during molding of the reel hub 32, which is formed by resin-molding, are improved.

Further again, because the push-operated surface 86C of the clutch member 84 passes through the through-hole 50 and through-hole 54A located at the axial center portion of the reel hub 32, a structure in which the clutch member 84 is pushed by the release surface 114A, which is separate from the magnet, while effective areas of the magnet 110 and the reel plate 54 are maintained is realized.

Accordingly, with the release surface 114A of the head portion 114, whose flatness is easier to ensure than flatness of the magnet 110, suppression of inclination of the clutch member 84 relative to the axial direction and consistent releasing of the locked state of the reel 28 are realized by the rotating shaft 100 with a simple structure.

Further yet, because the main body portion 62 of the braking member 60 includes the tubular portion 62A into which the upper portion of the clutch member 84 enters, a structure is realized in which, while a function of lowering the position of meshing of the brake gear 66 with the engaging gear 44 is maintained, the rotation-limiting ribs 88 and seating ribs 92 of the clutch member 84 are supported at the clutch boss portion 52 within the reel gear 42. Thus, a reduction in surface area of the reel plate 54 consequent to the clutch boss portion 52 protruding to the outer face side of the base portion 36 is avoided.

Further still, although it is necessary to provide the release surface 114A at the rotating shaft 100 of the drive device, as described above, the release surface 114A does not rub against the push-operated surface 86C. Therefore, there is no requirement to structure the release surface 114A with a resin member, and the structure of the rotating shaft 100 is not made more complicated. Specifically, because the release surface 114A is structured by the head portion 114 of the tap bolt 112 which fixes the rotating table 104 and the magnet 110 to the rotating spindle 102, there is no increase in the number of components and the number of assembly steps in accordance with the provision of the release surface 114A.

Further again, because the tap bolt 112 is screwed into the screw hole 102B of the rotating spindle 102 from above, the tap bolt 112 does not apply any limitations to structure of a lower end of the rotating spindle 102, that is, layout, etc. of a motor that drives the rotating spindle 102 or the like.

Thus, with the recording tape cartridge 10 relating to the present embodiment, locking of the reel 28 by the braking member 60 and releasing of the locking by the clutch member 84 can be carried out reliably, and limitations on the engaging gear 44 and reel gear 42 due to the provision of the clutch member 84 can be restrained.

Now, although the embodiment described above has a preferable structure in which the push-operated surface 86C of the clutch member 84 is disposed at the axial center portion of the reel hub 32 to serve as the operation portion, the present invention is not limited thus. For example, the clutch member 84 could be formed with one or a plurality of operation portions facing the gear aperture 20 from positions other than the axial center portion of the reel hub 32 and being operable from thereoutside.

Accordingly, a structure is also possible in which, for example, the clutch member 84 is formed with a form similar to the conventional release member 252, and operation portions similar to the three leg portions 254 pass through the base portion 36 and reel plate 54 and are disposed in a through-hole (facing the gear aperture 20).

Further, although the embodiment described above has a preferable structure in which the clutch member 84 is disposed to pass through the through-hole 50, the present invention is not limited thus. For example, a structure is also possible in which the clutch member 84 is disposed wholly within the reel hub 32, and is pushed for operation by a releasing portion of the drive device that intrudes into the through-hole 50.

Further still, although the embodiment described above has a preferable structure in which the push-operated surface 86C of the clutch member 84 makes surface contact with the release surface 114A of the drive device, the present invention is not limited by the shape of a drive device releasing portion or the like. Accordingly, the push-operated surface 86C may be pushed in line contact, surface contact or the like, and may be pushed by the magnet 110, a releasing portion that is made of resin, or the like.

Further yet, although the embodiment described above exemplifies a structure in which the recording tape cartridge 10 features the leader block 30, the present invention is not limited by forms of the case 12, a drawing-out structure of the magnetic tape T (structure of a leader member), a structure for opening and closing the aperture 18, and the like.

Accordingly, for example, the recording tape cartridge 10 may have a structure in which a small circular rod-form leader pin is attached to a distal end of the magnetic tape T to serve as the leader member, and may have a structure which includes a covering member for opening and closing the aperture 18 (a sliding door which moves along a predetermined straight line or circular arc, or the like).

Further again, although the embodiment described above has a structure in which a magnetic tape T is employed as the recording tape, the present invention is not limited thus. It is sufficient that the recording tape is one of long tape-form information recording/replaying media which can record information and replay information that has been recorded. Of course, the recording tape cartridge relating to the present invention can be applied to recording tape of any kind of recording/replaying system.

As has been explained above, a recording tape cartridge relating to the present invention has excellent effects in that locking of a reel with a braking member and releasing of the locking with a release member can be carried out reliably, and limitations that are applied to an engaging portion and a reel gear by provision of the release member can be restrained.

What is claimed is:

1. A recording tape cartridge comprising:
   a reel including a reel hub formed in a tubular shape with a base, recording tape being wound on an outer peripheral portion of the reel hub;
   an annular reel gear provided coaxially at an outer face of a base portion of the reel hub and capable of meshing with a driving gear of a drive device;
   an engaging portion provided at an inner face of the base portion along a circular circumference which is coaxial with the base portion;
   a case including a gear aperture, rotatably accommodating the reel, and exposing the reel gear through the gear aperture;
   a brake member provided to be non-rotatable relative to the case and movable toward and away from the base portion, the brake member being capable of attaining a rotation-locking position for engaging with the engaging portion and a rotation-enabling position for releasing a state of engagement with the engaging portion;
   an urging structure provided between the case and the brake member, the urging structure retaining the brake member at the rotation-locking position by an urging force; and
   a release member including
      a main body portion disposed in the reel hub at a radial direction inner side relative to the engaging portion, and
      an operation portion provided at the main body portion and facing the gear aperture through a portion of the base portion at a radial direction inner side relative to the reel gear,
   the release member being provided to be non-rotatable relative to the reel and movable in an axial direction, and the operation portion being pushed by a releasing portion of the drive device for moving the brake member to the rotation-enabling position against the urging force.

2. The recording tape cartridge of claim 1, wherein a through-hole passes through the base portion, and at least a portion of the main body portion of the release member is inserted into the through-hole.

3. The recording tape cartridge of claim 1, wherein the operation portion of the release member comprises a form which makes surface contact with the releasing portion of the drive device.

4. The recording tape cartridge of claim 1, wherein the operation portion is caused to face the gear aperture at an axial center portion of the reel hub.

5. The recording tape cartridge of claim 1, wherein the main body portion of the release member comprises a seating member, and the seating member engages with the reel at the rotation-locking position such that the main body portion, which is urged by the urging structure via the brake member, is retained to be non-movable in the axial direction.

6. The recording tape cartridge of claim 5, wherein the seating member is structured so as to continuously avoid interference thereof with the brake member at the rotation-enabling position.

7. The recording tape cartridge of claim 1, wherein the main body portion of the release member comprises a rotation-restricting member, and the rotation-restricting member engages with the reel such that the main body portion, which is urged by the urging structure via the brake member, is continuously retained to be substantially non-rotatable relative to the reel.

8. The recording tape cartridge of claim 7, wherein the rotation-restricting member is structured so as to continuously avoid interference thereof with the brake member at the rotation-enabling position.

9. The recording tape cartridge of claim 7, wherein a clearance between the rotation-restricting member and the reel is minimized such that a sliding resistance when the main body portion moves in the axial direction does not exceed a predetermined value.

10. The recording tape cartridge of claim 1, wherein the operation portion comprises a pushed surface at which the releasing portion of the drive device pushes, the reel gear includes tooth peaks, and the pushed surface is disposed slightly to a reelward side relative to the tooth peaks of the reel gear.

11. The recording tape cartridge of claim 1, wherein the release member rotates integrally with the reel.

12. A recording tape cartridge comprising:
a reel including a reel hub formed in a tubular shape with a base, recording tape being wound on an outer peripheral portion of the reel hub;
an annular reel gear provided coaxially at an outer face of a base portion of the reel hub and capable of meshing with a driving gear of a drive device;
an engaging portion provided at an inner face of the base portion along a circular circumference which is coaxial with the base portion;
a case including a gear aperture, rotatably accommodating the reel, and exposing the reel gear through the gear aperture;
a brake member provided to be non-rotatable relative to the case and movable toward and away from the base portion, the brake member being capable of attaining a rotation-locking position for engaging with the engaging portion and a rotation-enabling position for releasing a state of engagement with the engaging portion;
an urging structure provided between the case and the brake member, the urging structure retaining the brake member at the rotation-locking position by an urging force; and
a release member which is provided to be non-rotatable relative to the reel and movable in an axial direction, and which is pushed by a releasing portion of the drive device for moving the brake member to the rotation-enabling position against the urging force,
wherein the release member includes at least an operation portion which faces the gear aperture at a portion of the base portion at a radial direction inner side relative to the reel gear, and the release member is pushed by the releasing portion of the drive device via the operation portion.

13. The recording tape cartridge of claim 12, wherein the release member further comprises a main body portion which is disposed in the reel hub at a radial direction inner side relative to the engaging portion.

14. The recording tape cartridge of claim 12, wherein a through-hole passes through the base portion, and at least a portion of the release member is inserted into the through-hole.

15. The recording tape cartridge of claim 12, wherein the operation portion of the release member comprises a form which makes surface contact with the releasing portion of the drive device.

16. The recording tape cartridge of claim 12, wherein the operation portion is caused to face the gear aperture at an axial center portion of the reel hub.

17. The recording tape cartridge of claim 12, wherein the release member comprises a seating member, and the seating member engages with the reel at the rotation-locking position such that the release member, which is urged by the urging structure via the brake member, is retained to be non-movable in the axial direction.

18. The recording tape cartridge of claim 17, wherein the seating member is structured so as to continuously avoid interference thereof with the brake member at the rotation-enabling position.

19. The recording tape cartridge of claim 12, wherein the release member comprises a rotation-restricting member, and the rotation-restricting member engages with the reel such that the release member, which is urged by the urging structure via the brake member, is continuously retained to be substantially non-rotatable relative to the reel.

20. The recording tape cartridge of claim 19, wherein the rotation-restricting member is structured so as to continuously avoid interference thereof with the brake member at the rotation-enabling position.

21. The recording tape cartridge of claim 19, wherein a clearance between the rotation-restricting member and the reel is minimized such that a sliding resistance when the main body portion moves in the axial direction does not exceed a predetermined value.

22. The recording tape cartridge of claim 12, wherein the release member rotates integrally with the reel.

* * * * *